(12) United States Patent
Weibel et al.

(10) Patent No.: US 12,482,192 B2
(45) Date of Patent: Nov. 25, 2025

(54) COLLABORATIVE MIXED-REALITY SYSTEM FOR IMMERSIVE SURGICAL TELEMENTORING

(71) Applicants: THE REGENTS OF THE UNIVERSITY OF CALIFORNIA, Oakland, CA (US); Konrad Davis, San Diego, CA (US)

(72) Inventors: Nadir Weibel, La Jolla, CA (US); Michael Yip, San Diego, CA (US); Danilo Gasques Rodrigues, San Diego, CA (US); Thomas Sharkey, San Diego, CA (US); Janet Johnson, San Diego, CA (US); Konrad Davis, San Diego, CA (US)

(73) Assignee: THE REGENTS OF THE UNIVERSITY CALIFORNIA, Oakland, CA (US)

(*) Notice: Subject to any disclaimer, the term of this patent is extended or adjusted under 35 U.S.C. 154(b) by 236 days.

(21) Appl. No.: 17/980,438

(22) Filed: Nov. 3, 2022

(65) Prior Publication Data
US 2023/0360336 A1    Nov. 9, 2023

Related U.S. Application Data

(60) Provisional application No. 63/275,343, filed on Nov. 3, 2021.

(51) Int. Cl.
*G06T 19/00* (2011.01)
*A61B 90/00* (2016.01)
(Continued)

(52) U.S. Cl.
CPC .......... *G06T 19/006* (2013.01); *A61B 90/361* (2016.02); *A61B 90/37* (2016.02); *G06F 3/014* (2013.01); *G06T 13/40* (2013.01)

(58) Field of Classification Search
CPC ..... G06T 19/006; G06T 13/40; A61B 90/361; A61B 90/37; G06F 3/014
See application file for complete search history.

(56) References Cited

U.S. PATENT DOCUMENTS 9,767,613 B1 * 9/2017 Bedikian ............... G06F 1/1684
10,019,059 B2 * 7/2018 Messingher ............ G06F 3/016
(Continued)

OTHER PUBLICATIONS

S. Elmoghazy, E. Yacoub, N. V. Navkar, A. Mohamed and A. Erbad, "Survey of Immersive Techniques for Surgical Care Telemedicine Applications," 2021 10th Mediterranean Conference on Embedded Computing (MECO), Budva, Montenegro, 2021, pp. 1-6, doi: 10.1109/MECO52532.2021.9460135. (Year: 2021).*
(Continued)

*Primary Examiner* — Charles L Beard
(74) *Attorney, Agent, or Firm* — Sheppard, Mullin, Richter & Hampton LLP

(57) ABSTRACT

Systems and methods utilize mixed reality technologies to enable remotely located expert surgeons to instruct novice surgeons as if they were together in the same operating room. An example method may involve: (1) displaying, on a virtual reality (VR) display worn by a first person located in a second geographic location, a 3D virtual reconstruction of a patient located in a first geographic location; (2) determining a spatial relationship between a hand gesture performed by the first person and the 3D virtual reconstruction of the patient; and (3) displaying, on an augmented reality (AR) display worn by a second person located in the first geographic location, a 3D avatar of the hand gesture made to appear in a spatial relationship to the surgical subject that mirrors the determined spatial relationship between the hand gesture and the 3D virtual reconstruction of the patient.

20 Claims, 11 Drawing Sheets

(51) Int. Cl.
  *G06F 3/01*     (2006.01)
  *G06T 13/40*    (2011.01)

(56) References Cited

U.S. PATENT DOCUMENTS

| | | | |
|---|---|---|---|
| 10,610,303 B2* | 4/2020 | Johnson | G09B 9/00 |
| 10,678,335 B2* | 6/2020 | Keller | G06K 19/07762 |
| 10,698,493 B1* | 6/2020 | Crowther | A61B 34/37 |
| 10,803,616 B1* | 10/2020 | Twigg | G06V 20/64 |
| 10,816,939 B1* | 10/2020 | Coleman | G01S 17/86 |
| 10,977,869 B2* | 4/2021 | Hu | A63F 13/65 |
| 11,011,077 B2* | 5/2021 | Garcia Kilroy | A61B 34/30 |
| 11,200,742 B1* | 12/2021 | Post | G06T 19/003 |
| 11,442,685 B2* | 9/2022 | Anderson | G06F 3/147 |
| 11,630,633 B1* | 4/2023 | MacDougall | G06F 3/017 |
| | | | 715/204 |
| 11,850,005 B1* | 12/2023 | Thomas | G06T 7/344 |
| 11,922,581 B2* | 3/2024 | Komp | G06F 3/011 |
| 11,998,281 B1* | 6/2024 | Roh | G16H 80/00 |
| 12,019,773 B2* | 6/2024 | Cho | G06F 3/011 |
| 12,079,395 B2* | 9/2024 | Cho | G06V 20/20 |
| 12,144,551 B1* | 11/2024 | Farley | A61B 90/39 |
| 12,144,559 B1* | 11/2024 | Roh | A61B 34/25 |
| 12,148,114 B2* | 11/2024 | Cho | G06F 3/011 |
| 12,148,518 B2* | 11/2024 | Chaoui | A61B 90/08 |
| 2005/0033117 A1* | 2/2005 | Ozaki | G16H 40/63 |
| | | | 600/117 |
| 2010/0234857 A1* | 9/2010 | Itkowitz | G09B 23/285 |
| | | | 700/259 |
| 2011/0238079 A1* | 9/2011 | Hannaford | A61B 34/76 |
| | | | 606/130 |
| 2012/0293506 A1* | 11/2012 | Vertucci | G06F 3/012 |
| | | | 345/419 |
| 2014/0081659 A1* | 3/2014 | Nawana | G16H 10/20 |
| | | | 705/3 |
| 2014/0275760 A1* | 9/2014 | Lee | A61B 1/00045 |
| | | | 600/102 |
| 2015/0309582 A1* | 10/2015 | Gupta | G06F 3/011 |
| | | | 345/156 |
| 2016/0147308 A1* | 5/2016 | Gelman | G06F 3/04845 |
| | | | 345/156 |
| 2016/0210783 A1* | 7/2016 | Tomlin | G02B 27/017 |
| 2016/0358380 A1* | 12/2016 | Yeom | G02B 27/01 |
| 2016/0358383 A1* | 12/2016 | Gauglitz | G06F 3/0304 |
| 2017/0042631 A1* | 2/2017 | Doo | H04N 13/398 |
| 2017/0086712 A1* | 3/2017 | Mauro | A61B 5/1101 |
| 2017/0140552 A1* | 5/2017 | Woo | G06F 3/0304 |
| 2017/0315774 A1* | 11/2017 | Meerbeek | G16H 40/63 |
| 2018/0071032 A1* | 3/2018 | de Almeida Barreto | |
| | | | G06T 19/006 |
| 2018/0082480 A1* | 3/2018 | White | A61B 90/94 |
| 2018/0108145 A1* | 4/2018 | Miura | H04N 13/344 |
| 2018/0293802 A1* | 10/2018 | Hendricks | G09B 23/30 |
| 2018/0324229 A1* | 11/2018 | Ross | G06F 3/1423 |
| 2018/0368930 A1* | 12/2018 | Esterberg | G06T 17/00 |
| 2019/0005848 A1* | 1/2019 | Garcia Kilroy | G16H 40/67 |
| 2019/0053851 A1* | 2/2019 | Siemionow | A61B 34/25 |
| 2019/0053855 A1* | 2/2019 | Siemionow | A61B 90/37 |
| 2019/0080515 A1* | 3/2019 | Geri | G06F 3/012 |
| 2019/0146578 A1* | 5/2019 | Ikuta | G06F 3/017 |
| | | | 345/8 |
| 2019/0231432 A1* | 8/2019 | Amanatullah | A61B 90/361 |
| 2019/0231433 A1* | 8/2019 | Amanatullah | A61B 17/1703 |
| 2019/0236840 A1* | 8/2019 | Zuckerman | G06F 3/011 |
| 2019/0282324 A1* | 9/2019 | Freeman | A61H 31/005 |
| 2019/0333286 A1* | 10/2019 | Hsiao | G06T 7/80 |
| 2019/0385342 A1* | 12/2019 | Freeman | G06T 11/00 |
| 2020/0027374 A1* | 1/2020 | Stone | G06V 10/7747 |
| 2020/0066413 A1* | 2/2020 | Broomhall | G16H 50/50 |
| 2020/0100661 A1* | 4/2020 | Chen | A61B 90/37 |
| 2020/0129136 A1* | 4/2020 | Harding | G06F 3/011 |
| 2020/0143594 A1* | 5/2020 | Lal | G16H 30/20 |
| 2020/0186786 A1* | 6/2020 | Gibby | H04N 13/327 |
| 2020/0188028 A1* | 6/2020 | Feiner | G16H 50/50 |
| 2020/0357176 A1* | 11/2020 | Crowther | G06F 3/011 |
| 2020/0405398 A1* | 12/2020 | Amanatullah | G02B 27/017 |
| 2021/0104102 A1* | 4/2021 | Cavallo | G06T 15/40 |
| 2021/0134065 A1* | 5/2021 | Ramani | G06F 3/0346 |
| 2021/0142568 A1* | 5/2021 | Kim | H04L 65/1069 |
| 2021/0161612 A1* | 6/2021 | Black | A61B 17/3403 |
| 2021/0169578 A1* | 6/2021 | Calloway | A61B 34/20 |
| 2021/0192413 A1* | 6/2021 | Shirazipour | G06Q 10/06311 |
| 2021/0223855 A1* | 7/2021 | Gibby | G06F 3/011 |
| 2021/0231950 A1* | 7/2021 | Kajita | H04N 23/73 |
| 2021/0282887 A1* | 9/2021 | Wiggermann | G06T 19/006 |
| 2021/0286179 A1* | 9/2021 | Miller, IV | G06F 3/013 |
| 2021/0307831 A1* | 10/2021 | Fuerst | G02B 27/017 |
| 2021/0350604 A1* | 11/2021 | Pejsa | G06F 3/012 |
| 2021/0378768 A1* | 12/2021 | Olson | A61B 34/20 |
| 2022/0067974 A1* | 3/2022 | Gunkel | G06F 3/012 |
| 2022/0079705 A1* | 3/2022 | Navkar | G16H 80/00 |
| 2022/0096197 A1* | 3/2022 | Song | A61B 90/36 |
| 2022/0104822 A1* | 4/2022 | Shelton, IV | A61B 90/92 |
| 2022/0104896 A1* | 4/2022 | Shelton, IV | A61B 34/37 |
| 2022/0179552 A1* | 6/2022 | Burckel | G06F 3/04883 |
| 2022/0202493 A1* | 6/2022 | Gibby | A61B 34/10 |
| 2022/0265357 A1* | 8/2022 | Morvan | A61B 90/361 |
| 2022/0287676 A1* | 9/2022 | Steines | A61B 90/37 |
| 2022/0301268 A1* | 9/2022 | Porat | A61B 90/36 |
| 2022/0338049 A1* | 10/2022 | Ross | G06T 7/70 |
| 2022/0375620 A1* | 11/2022 | Scheib | A61B 34/30 |
| 2022/0384029 A1* | 12/2022 | Lee | G16H 20/10 |
| 2022/0398744 A1* | 12/2022 | Couture | A61B 34/74 |
| 2023/0017128 A1* | 1/2023 | Nash | A61B 34/10 |
| 2023/0038709 A1* | 2/2023 | Ramani | G06F 3/017 |
| 2023/0054394 A1* | 2/2023 | Luo | A61B 90/50 |
| 2023/0083605 A1* | 3/2023 | Robinson | G06V 40/107 |
| | | | 606/1 |
| 2023/0094459 A1* | 3/2023 | Erasmus | H04L 65/4015 |
| | | | 345/156 |
| 2023/0157762 A1* | 5/2023 | Braido | A61B 34/37 |
| | | | 600/424 |
| 2023/0169696 A1* | 6/2023 | Gibby | G06V 20/20 |
| | | | 345/633 |
| 2023/0169740 A1* | 6/2023 | Gibby | G06T 7/30 |
| | | | 345/619 |
| 2023/0233259 A1* | 7/2023 | Young | A61B 17/1764 |
| | | | 606/88 |
| 2023/0267692 A1* | 8/2023 | Dong | G06V 40/103 |
| | | | 382/154 |
| 2023/0280822 A1* | 9/2023 | Kocienda | G06T 7/70 |
| | | | 345/156 |
| 2023/0290081 A1* | 9/2023 | Kawamae | H04N 21/41407 |
| 2023/0355315 A1* | 11/2023 | Upadhyaya | A61B 34/10 |
| 2023/0406684 A1* | 12/2023 | Jaramaz | A61B 34/30 |
| 2023/0419855 A1* | 12/2023 | Wallace | G06T 13/40 |
| 2024/0005432 A1* | 1/2024 | Aman | G16H 10/40 |
| 2024/0008935 A1* | 1/2024 | Wolf | A61B 34/25 |
| 2024/0029367 A1* | 1/2024 | Golenberg | G09B 23/28 |
| 2024/0070995 A1* | 2/2024 | Mahalingam | G06F 3/017 |
| 2024/0086843 A1* | 3/2024 | Maggiore | G06F 3/012 |
| 2024/0112399 A1* | 4/2024 | Ramani | G06V 40/28 |
| 2024/0135831 A1* | 4/2024 | Ramani | G09B 5/02 |
| 2024/0143083 A1* | 5/2024 | Cheng | G06F 3/011 |
| 2024/0221222 A1* | 7/2024 | Zhou | G02B 27/0172 |
| 2024/0268922 A1* | 8/2024 | Calloway | A61B 90/36 |
| 2024/0288946 A1* | 8/2024 | Evangelidis | G06T 7/74 |
| 2024/0320935 A1* | 9/2024 | Pissarenko | A61B 34/25 |
| 2024/0338907 A1* | 10/2024 | Krans | G06T 7/70 |
| 2024/0341903 A1* | 10/2024 | Sharma | A61B 34/10 |
| 2024/0372741 A1* | 11/2024 | Legatski | G06F 3/0304 |
| 2024/0420851 A1* | 12/2024 | Pelzl | G06T 15/08 |
| 2024/0423720 A1* | 12/2024 | Gupta | G06T 7/0012 |
| 2024/0428926 A1* | 12/2024 | Schreckenberg | G06F 3/012 |
| 2025/0032206 A1* | 1/2025 | Mahoney | G06T 7/20 |
| 2025/0134610 A1* | 5/2025 | Murugappan | A61B 34/25 |

OTHER PUBLICATIONS

M. R. Desselle, R. A. Brown, A. R. James, M. J. Midwinter, S. K. Powell and M. A. Woodruff, "Augmented and Virtual Reality in

(56) References Cited

OTHER PUBLICATIONS

Surgery," in Computing in Science & Engineering, vol. 22, No. 3, pp. 18-26, May 1-Jun. 2020, doi: 10.1109/MCSE.2020.2972822. (Year: 2020).*

* cited by examiner

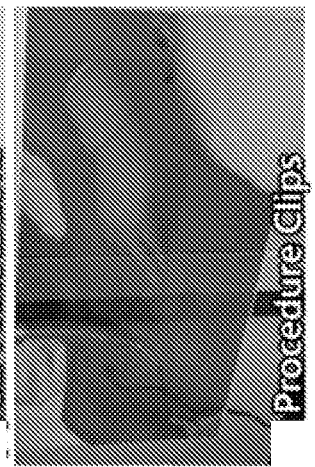
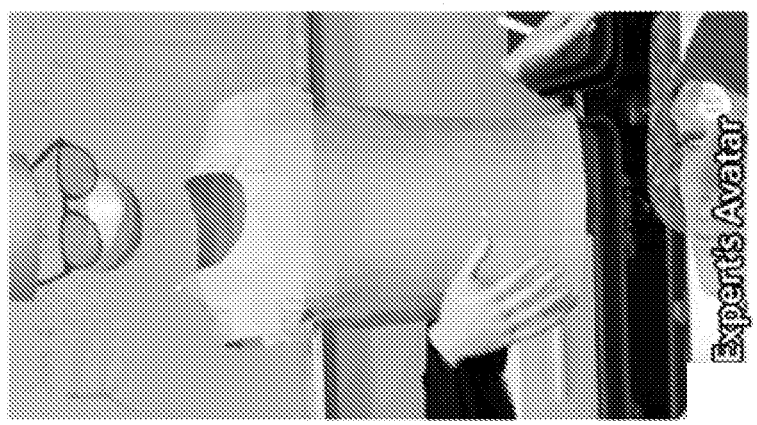
FIG. 4

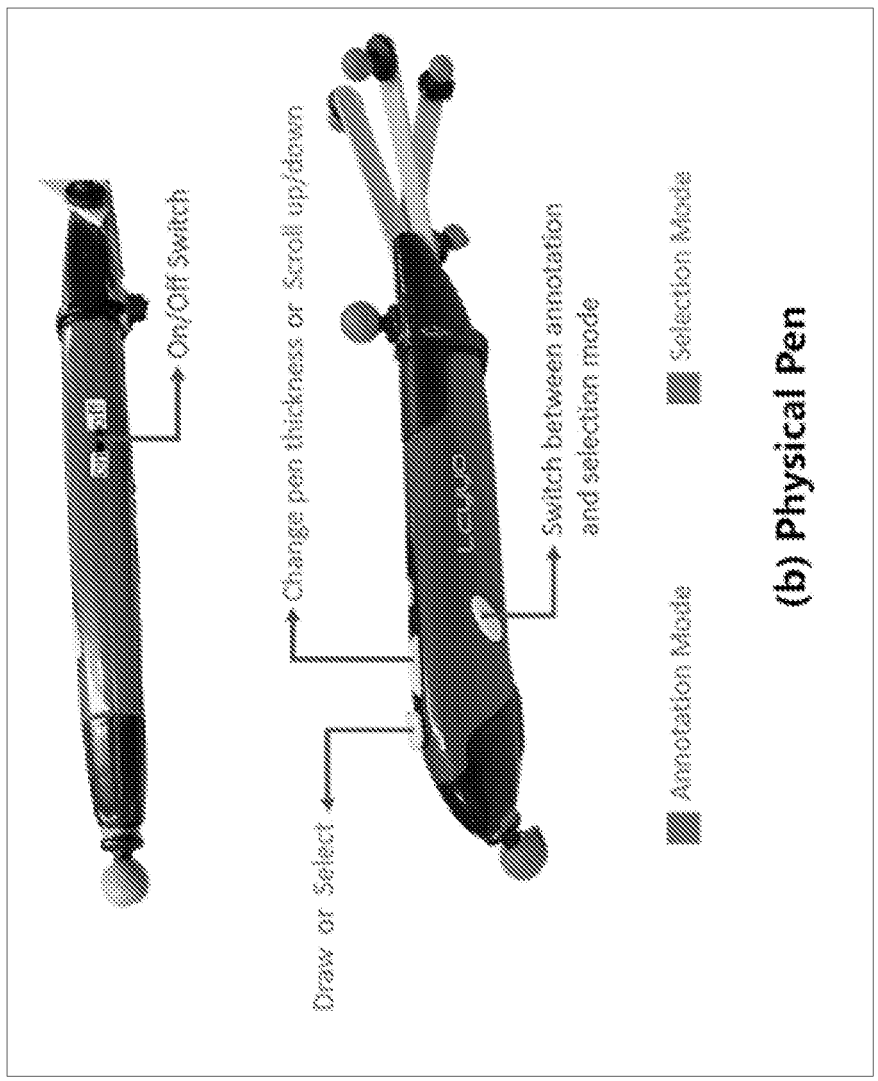
FIG. 6

1000

COMPUTING COMPONENTS 1010

1012
HARDWARE PROCESSORS

MACHINE-READABLE STORAGE MEDIA 1014

1016
OBTAIN, FROM A DEPTH CAMERA, 3D IMAGES OF A SURGICAL SUBJECT LOCATED IN A FIRST GEOGRAPHIC LOCATION

1018
DISPLAY, ON A HEAD-MOUNTED VR DISPLAY WORN BY A FIRST PERSON LOCATED IN A SECOND GEOGRAPHIC LOCATION, A 3D VIRTUAL RECONSTRUCTION OF THE SURGICAL SUBJECT BASED ON THE OBTAINED 3D IMAGES OF THE SURGICAL SUBJECT

1020
DETERMINE A SPATIAL RELATIONSHIP BETWEEN A HAND GESTURE MADE BY THE FIRST PERSON AND THE 3D VIRTUAL RECONSTRUCTION OF THE SURGICAL SUBJECT AS THE 3D VIRTUAL RECONSTRUCTION OF THE SURGICAL SUBJECT IS MADE TO APPEAR ON THE HEAD-MOUNTED VR DISPLAY

1022
DISPLAY, ON A HEAD-MOUNTED AR DISPLAY WORN BY A SECOND PERSON LOCATED IN THE FIRST GEOGRAPHIC LOCATION, A 3D AVATAR OF THE HAND GESTURE MADE TO APPEAR IN A SPATIAL RELATIONSHIP TO THE SURGICAL SUBJECT THAT MIRRORS THE DETERMINED SPATIAL RELATIONSHIP BETWEEN THE HAND GESTURE AND THE 3D VIRTUAL RECONSTRUCTION OF THE SURGICAL SUBJECT AS THE 3D VIRTUAL RECONSTRUCTION OF THE SURGICAL SUBJECT IS MADE TO APPEAR ON THE HEAD-MOUNTED VR DISPLAY

*FIG. 10*

COLLABORATIVE MIXED-REALITY SYSTEM FOR IMMERSIVE SURGICAL TELEMENTORING

REFERENCE TO RELATED APPLICATION

The present application claims priority to U.S. Patent Provisional Application No. 63/275,343, filed Nov. 3, 2021 and titled "COLLABORATIVE MIXED-REALITY SYSTEM FOR IMMERSIVE SURGICAL TELEMENTORING," which is incorporated herein by reference in its entirety.

STATEMENT REGARDING FEDERALLY SPONSORED R&D

This invention was made with government support under Grant No. N6264518C4016, awarded by Naval Medical Logistics Command. The government has certain rights in the Invention.

TECHNICAL FIELD

Embodiments generally relate to medical technologies. More particularly, various embodiments are related to a mixed-reality system for immersive surgical and procedural telementoring.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 depicts a series of diagrams illustrating an example mixed-reality system for immersive surgical telementoring, in accordance with embodiments of the disclosed technology.

FIG. 6 depicts two images which illustrate example implements which may be used with embodiments of the disclosed technology.

FIG. 10 depicts an example computing system that may be used to facilitate collaborative telementoring, in accordance with various embodiments of the presently disclosed technology.

DETAILED DESCRIPTION OF THE EMBODIMENTS

Figure 1:
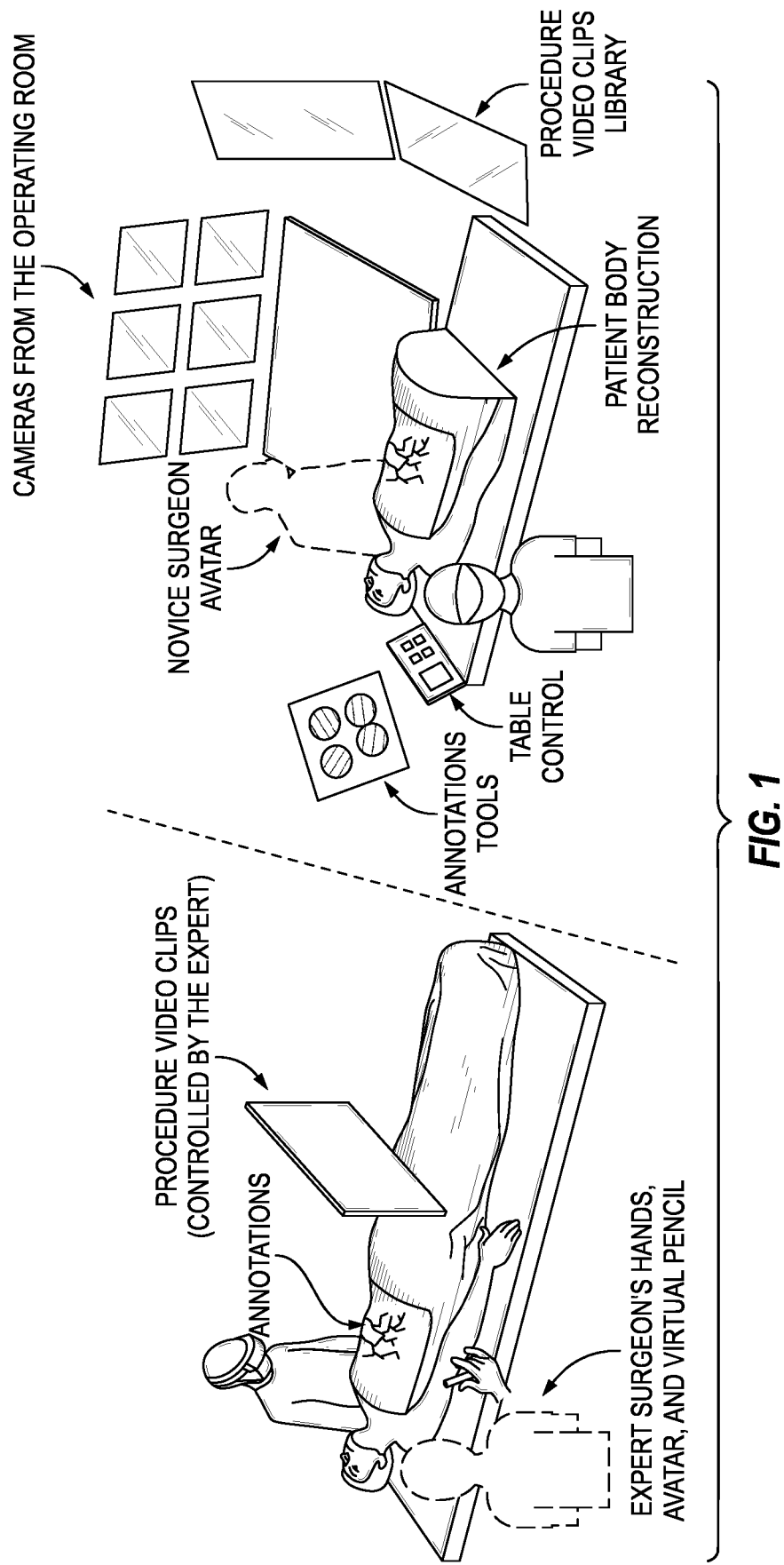
FIG. 1 depicts a diagram illustrating an example mixed-reality system for immersive surgical telementoring, in accordance with embodiments of the disclosed technology.

Introduction: Whether from car accident, gunshot wound, or traumatic injury due to natural or man-made disasters, trauma often requires timely life-saving interventions. However, the expertise required to perform these actions is not ubiquitously present even within first world medical care systems. In situations where medical expertise or facilities are not available locally, surgeons rush to perform lifesaving interventions that stabilize patient vitals before transferring the patient to a specialized surgical facility. When local surgeons lack the expertise to perform these life-saving interventions, they may rely on remote guidance from expert surgeons through telementoring. Unfortunately, existing telementoring systems can limit how remote experts guide and collaborate with local, inexperienced surgeons.

Telementoring as a form of telemedicine may refer to the use of information systems to provide real-time remote guidance from an expert proceduralist (i.e., a medical professional such as a surgeon who is an expert in a given diagnostic or therapeutic procedure) to an inexperienced proceduralist (i.e., a medical professional such as a surgeon who has less experience with the given diagnostic or therapeutic procedure). In the context of surgical procedures, telementoring systems typically require expert surgeons to instruct novice surgeons by annotating a live video feed of the surgical environment. Remote experts may map actions they would normally express through gestures and actions into limited video-based interactions and verbalization. Novices operating on the patient generally have the extra burden to translate these instructions from a nearby screen to the operating field, with increased possibilities to make mistakes in the process.

Mixed Reality (MR) technology may enable the creation of remote collaboration experiences where participants can interact with remote collaborators more naturally. The space of remote collaboration in MR has seen promising works with a focus on training and, more recently, also on telementoring projects.

Accordingly, various embodiments of the presently disclosed technology may provide an Augmented Reality (AR)-Virtual Reality (VR) collaboration system that can support collaboration practices used by expert surgeons to aid novice surgeons. For example, embodiments may support remote surgical mentoring of novices through synchronous point, draw, and look affordances and asynchronous video clips.

While modern telesurgery or telementoring can be limited to just audio/video, embodiments may enable skilled surgeons and novices to share the same virtual space. Expert surgeons in remote sites may use Virtual Reality to access a 3D reconstruction of a patient's body and can instruct novice surgeons on complex procedures as if they were together in the operating room. Novice surgeons can focus on saving the patient's life while being guided through an intuitive Augmented Reality interface.

Embodiments may integrate 3D remote live assistance in surgery using both AR (for novices) and VR (for experts). These embodiments may reconstruct the patient environment as an immersive 3D point cloud on the VR expert side. Embodiments may also uniquely and precisely allow experts to anchor annotations, gestures, videos, and remote avatars so that they are situated in the same/similar position as if remote expert and local novice were co-located.

In various embodiments, a novice bedside environment may be equipped with a Microsoft HoloLens worn by the novice surgeon, one or more depth-cameras to capture the 3D scene (e.g. 1× Microsoft Azure Kinect placed on top of the bed and attached to a surgical lamp, 2× Intel RealSense cameras in the corners of the room, and 2× Intel RealSense cameras on wheels movable in the operating room), and an OptiTrack optical marker system to track the movements of objects and people in the room (markers may be attached to the HoloLens, the Kinect camera, and the surgical table).

The expert's remote environment may be equipped with a video-see-through Virtual Reality headset (e.g. HTC Vive Pro). This headset may be provided with or without a wireless adapter that can make it untethered, hand+finger tracking for the expert surgeon based on an IMU-equipped gloves, a wireless mouse-pen used for annotations and VR-based interactions, and an OptiTrack optical marker system to track the movements of objects and people in the room. Here, markers may be attached to the Vive Headset, surgical table proxy, gloves, and wireless pen.

Generally, the novice surgeon's main goal is to operate on the patient. To avoid distractions, the AR interface of various embodiments may be passive (by design the novice surgeon may not able to directly interact with the interface). Various features described below may be controlled remotely by the expert. For instance, if the novices need to hide annotations or play a procedure clip, then they can request the expert surgeon to do so. The novice surgeons may be able to see various holographic representations in front of them. For example, the novice surgeon may be able to view any one, or combination of: (a) the expert's avatar and hands, (b) a remote pen and 3D annotations, and (c) procedural video clips. In addition, the novice surgeon may be able to provide direct views of the patient and the surgery to the remote expert by, e.g., manipulating the position of the Kinect camera, directly attending to regions of interest with the HoloLens device's camera, etc.

The expert surgeon's Virtual Reality interface may provide surgeons with a virtual operating room. In this operating room, the 3D reconstruction of the patient may be at the center of the stage, surrounded by tools and VR camera views (from, e.g., the Kinect, RealSense and HoloLens cameras) designed to make the expert surgeons' interaction with the system more efficient and natural. Accordingly, embodiments may enable the expert to successfully explain procedural and conceptual steps of the surgery being performed. The expert surgeon may interact with the interface via a laser pointer, but unlike most VR experiences, this laser pointer can be implemented through an actual physical pen, and not as a virtual tool that an expert "grabs" with VR controllers. This can be a more natural interface for surgeons who are used to holding scalpels during surgery. Certain embodiments may not use regular VR controllers to facilitate the use of gestures and tools by an expert surgeon who may be inexperienced with VR experiences. Thus, instead of having users learn how to map controller buttons to gestures and actions, the expert surgeons may wear real gloves as if they were wearing surgical gloves. In some embodiments, the experts' only surgical tool may be a pen that they can hold and feel with their hands, and can point, select, or draw a surgical line or incision.

In summary, various embodiments may consist of two separate spaces: AR and VR. The AR side may encompass the novice surgeon's AR head-mounted display and the server that connects to the cameras and trackers in the operating room. The VR side may encompass tracking hardware used for the expert surgeon. Each computing device (e.g. HoloLens, Server Computer, and VR computer) may run an application developed in Unity 2018.3. The AR application may use HoloLens as the AR headset and a standalone computer (Server Computer). HoloLens may send audio and video directly to the VR application through WebRTC. It can also receive tracking data and commands directly from the VR computer. Embodiments may utilize a separate computer—the Server Computer—to encode and stream data from the many cameras installed in the operating room. An Azure Kinect depth camera may be used to create the patient's point-cloud at a resolution of 1280×720, 30 fps. The Server Computer may also encode and stream frames from color cameras (e.g. 2 Intel RealSense on rolling wheels, 2 Intel RealSense in the corners of the room). Embodiments may also utilize motion capture cameras (e.g. five OptiTrack Prime 13 cameras) to cover the entire surgical space. These cameras may track HoloLens, the surgical table, and the surgical lamp, while the calibration marker may be used to realign annotations. Tracking data from these cameras can flow from OptiTrack's Motive to the Server Computer and then to both the HoloLens and the VR Computer through a custom protocol. The VR system may use an untethered HTC Vive Pro as the VR headset. Similar to the AR space, the VR system may use OptiTrack motion capture cameras to track the VR headset, the pen, the gloves, and a physical table that serves as a proxy to the surgical table. Both the pen and the gloves may be commodity hardware that connect to the VR computer through bluetooth. Embodiments may use OptiTrack's active Vive tracker to track the VR headset instead of using Vive's default tracking technology.

Various embodiments of the presently disclosed technology may build upon and improve existing works in MR by taking a human-centered approach to designing a surgical telementoring system. Through role-playing sessions with surgeons and iterative prototyping, insights may be gained into the features of MR that are useful in surgical and collaborative applications. Based on (a) the communication needs of expert surgeons, and (b) novice surgeons' constraints—a collaborative MR system for immersive surgical telementoring may be built. In certain examples, this collaborative MR system may be referred to as ARTEMIS.

In accordance with various embodiments, ARTEMIS may refer to a surgical telementoring system which gives experts an immersive VR operating room where they can use gestures and 3D annotations on a 3D reconstruction of a patient's body to guide novice surgeons in Augmented Reality. ARTEMIS' intuitive AR experience can allow local surgeons to focus on the patient and the tasks at hand, rather than having to interact with complicated AR interfaces.

Embodiments may provide various contributions to the human-computer interaction, surgical innovation, and user interface software and technology research space. For example, ARTEMIS' design process (including software artifacts) may facilitate technology exploration. In another example, embodiments may development real-time, mixed reality collaborative systems for telementoring surgical procedures. As a third example, embodiments may provide an initial qualitative evaluation of ARTEMIS through mannequin and cadaveric subjects.

Collaboration in Mixed Reality: Studies show that participants collaborating on physical tasks over video typically under-perform relative to participants that are collaborating side-by-side. Unlike video systems, collocated collaborators can see and understand spatial relationships between each other, the task, and the environment. They may use shared visual information to communicate more effectively through a combination of verbalization, gestures, and actions.

The continuous development of MR input and display technology has been addressing the limitations of video communication by introducing support to key components that make side-by-side collaboration efficient. Examples of this may include hand gestures, sketches, annotations, real-time representations of a remote environment, gaze, shape of remote objects, collaborators as avatars, virtual replicas of task object, haptics, and more.

Various works in the field of MR provide a range of contributions, from enabling technology to user evaluations of new interfaces to new interaction modalities. These works approach remote collaboration from artificial domains, environments, tasks, and people in the environment, in order to uncover general principles. However, there is a need for a more specific distillation of these principles in order to apply them to a specific domain (e.g., trauma surgery). For example, remote laparoscopic procedures in practice (as well as in studies) are typically based on a system where a mentor can annotate a live video of the mentee's task space. However, communication in the robot-building task proposed by some shares little resemblance to what is communicated in laparoscopic surgery. Thus, while certain interfaces may lead to faster performance and better coordination between mentor and mentees, they can lead to mistakes and misunderstandings in a laparoscopic environment.

Accordingly, instead of adapting physical-collaboration systems such as Microsoft Remote Assist and LOKI to the surgical domain, various embodiments of the presently disclosed technology take a step back to better leverage the existing remote collaboration literature, and understand its limitations and unique uses in surgery. Embodiments may involve surgeons in the design process and explore the use of different enabling technologies (including Microsoft Remote Assist) through a design exploration grounded in participatory design techniques such as role-playing and body-storming.

Telementoring in Mixed Reality: The domain of telementoring has greatly benefited from advances in telecommunication technologies. In a typical telementoring scenario, a senior or "expert" surgeon coaches a novice surgeon through a video stream. A common drawback for this conventional telementoring approach is that it requires novice surgeons to memorize the instructions (e.g., the position length and orientation of annotations) received on the display to perform them on the patient. This continuous focus in shift from patient to nearby tablet and back may cause cognitive overload, and potentially surgical errors.

Similar to the general remote collaboration literature, the introduction of Mixed Reality in telementoring generally aimed at overcoming drawbacks of conventional telementoring. For example, certain technologies use a tablet display between the novice surgeon and the patient body and prevent unnecessary focus shift by showing instructions directly over the surgical field. However, these tablet displays can only represent a flat image (no depth or 3D cues). Thus, more recently, newer technologies have been introduced to provide novices with a head-mounted display so that they can have stereo view (depth cues) of annotations and instructions on the patient body. Situated instructions are known to increase procedural adherence as well as decrease execution times. A limitation of many of these technologies systems is that the expert surgeon sees and annotates the patient view on a flat monitor. These annotations then sit flat onto the patient as the expert surgeon is unable to give them a custom depth, required for example, to show the depth of an incision.

As will be described in greater detail below, surgeons annotating a 3D body typically need 3D annotations that they can shape freely with their hands. Embodiments (e.g. ARTEMIS) may build on previous research by combining a 3D annotation interface for an expert with a 3D annotation interface for a novice. Embodiments may also to introduce non-verbal communication channels that bring telementoring closer to situated mentoring (e.g., gestures) and even improve upon it (e.g., procedure videos).

Designing a Mixed Reality Telementoring System: In designing a collaborative mixed reality platform for surgery, embodiments may address a few problems. For example, embodiments may learn to understand how expert surgeons mentor inexperienced surgeons—their approach, their goals, and their unaddressed needs. As another example, embodiments may learn to understand how different MR interfaces can support the surgeon's activities. Both problems tend to be contextual and experiential. Moreover, the usefulness of an MR collaboration interface for a specific scenario may depend on various contextual and environmental factors.

To take into consideration the environment and the medical procedure, and to better understand user needs, embodiments may break down a design process into two phases: (1) a role-playing phase in a mock-up surgical environment; and (2) an iterative prototyping phase where experts can perform procedures on mannequins and cadavers.

Figure 2:
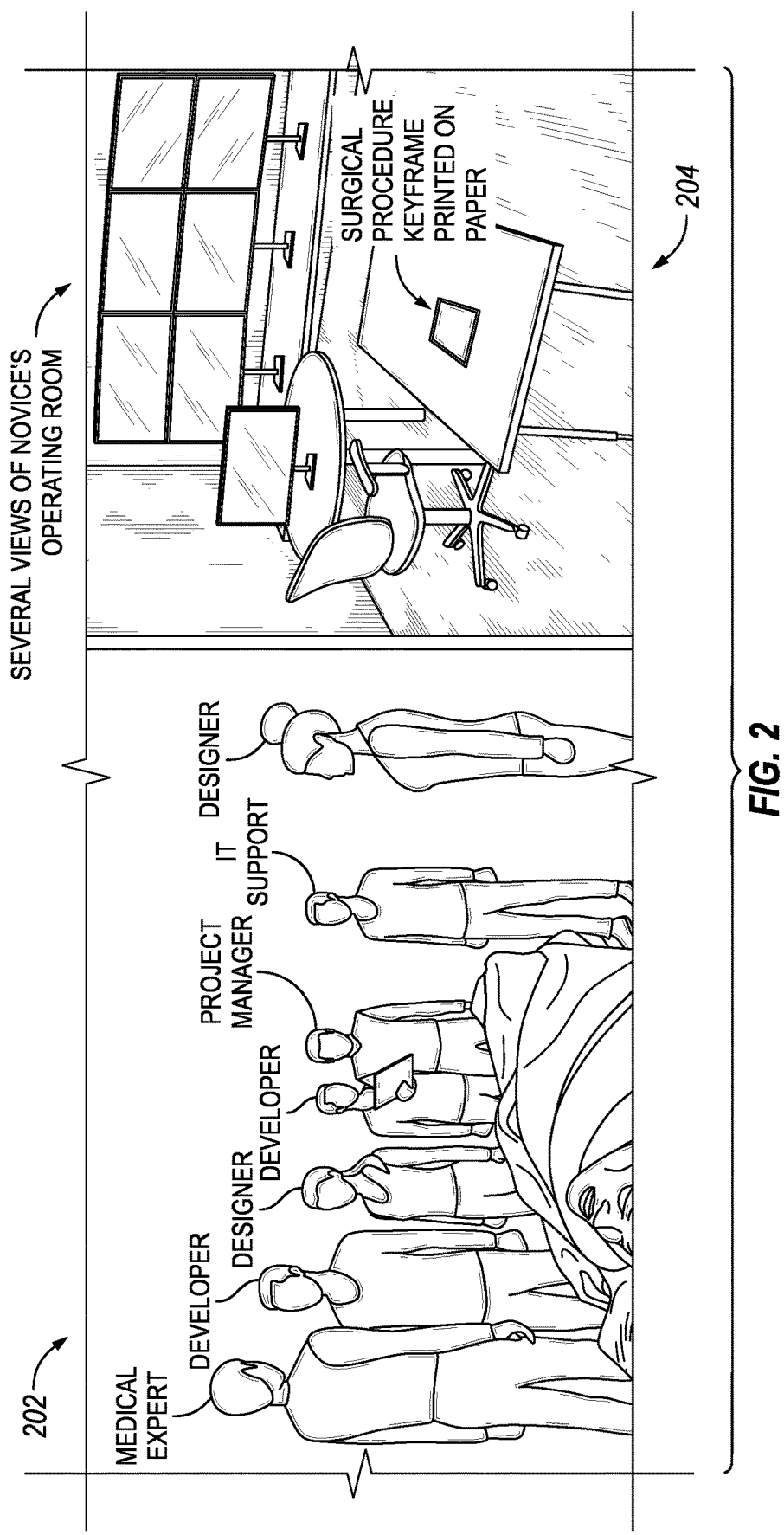
FIG. 2 depicts images from example experiments conducted in accordance with embodiments of the disclosed technology.

Role-playing in a mock-in operating room: Example experiments/role-playing sessions were conducted in accordance with embodiments of the presently disclosed technology in order to better understand how experienced surgeons mentor inexperienced surgeons. In these experiments, researchers received feedback on the use of MR interactions in a trauma telementoring situation. For these example experiments, seven domain experts (4 surgeons and 3 operating room technology specialists) were invited to participate in four role-playing sessions. To contextualize the role-playing sessions, emergency procedures were simulated on a mannequin in a mock-up operating room (see, e.g., diagram 202 of FIG. 2).

Each session was composed of two stages. First, an expert surgeon was asked to walk through an emergency procedure while they enacted it on the simulation mannequin. This illustrated how mentors make sense of what they do—how they make decisions, how they communicate surgical steps to a novice surgeon, as well as the expectations they have of the novice surgeon. During this first stage, questions were asked to facilitate an understanding of the specifics of the procedure as well as the specifics of the expert surgeon's mentoring approach for that procedure. In the second stage of the role-playing session, experts were invited to try existing MR applications and interfaces. Customized prototypes were tested based on previous observations as well as existing tools such as Microsoft Remote Assist. This occurred in an isolated part of the room where experts were unable to see the mannequin in the mock-up operating room but were still able to talk to the designer who acted as a novice surgeon (see, e.g., diagram 204 of FIG. 2). Finally, given the experts' backgrounds in battlefield care, three commonly used procedures were selected from military emergency scenarios: needle decompression, leg fasciotomy and cricothyrotomy. While each procedure could not actually be performed on the medical mannequin, different stages of the procedure were walked through using printed images of a surgical video (i.e., each image showed a different stage of the procedure).

Role-playing may be used in the design of interactive systems as it can help users, designers and developers communicate needs and constraints. Hence, embodiments were able to use these role-playing sessions as an opportunity to involve other team members as well as operating room technology specialists from the same hospital where embodiments such as ARTEMIS were later deployed for additional example experiments. In the following paragraphs, analysis of these role-playing sessions will be described in greater detail. This analysis may be organized according to three questions related to expert surgeons telementoring novice surgeons: (1) How do mentors guide mentees?; (2) How much information does the mentor need from the mentee side?; and (3) What do mentors want to show to mentees?

How do mentors guide mentees?: In a common, co-located situation, experts stand side-by-side with a novice surgeon as the novice surgeon operates on the patient (or cadaver). Novices are generally expected to have basic surgical skills, but often are unsure about the specifics of the procedure they are performing—e.g. "Where do I put the needle? Where do I make the incision? How do I put the tube in?" Thus, experts may chime in to explain to novices how to find the incision location, how to make the incision, and how to use other tools required by the procedure (e.g., tubes and clamps). To find the location of an incision, surgeons may rely on anatomical landmarks—known body features—as well as touching and feeling the patient. According to the surgeons interviewed in these example experiments/role-playing sessions, for many procedures, the hardest part of the procedure can be finding out where to make an incision. In a cricothyrotomy, for example, surgeons generally hold the patient's chin with their left hand and probe the neck with their thumb to find a soft spot where the incision will be made.

After finding the location of the procedure, expert surgeons may then proceed by showing novices the landmarks and marking paths where novices should make incisions with a skin marker. If the novice needs to use a specialized tool, the expert surgeon can demonstrate how to use the tool by mimicking the motion and maneuvering of the instrument above the patient. Mentoring styles vary as experts may stand side-by-side with novices or across the table from them. In a scenario where a novice is unable to replicate instructions, some expert surgeons move the novice to the side, position themselves in the same location as the novice, and then enact the procedure from where the mentee should perform it, e.g. ("I move that person away to show them how to do it right (and not do it).")

How much information does the mentor need from the mentee?: During the example role-playing sessions, this question was approached in two ways. First, as experts walked through the different steps of a procedure, they were asked what information they used to make procedural decisions. They were also asked how they would be able to make a decision without that information. Second, in the technological exploration part of each role-playing session, the experts were asked to interact with existing AR and VR technology to facilitate an understanding of how existing applications could support their efforts. Findings from these example experiments/sessions are summarized below.

First, as highlighted above, surgeons may use a combination of touch and visual landmarks to locate the part of the body where they will operate. The example experiments/ sessions conducted in accordance with embodiments focused on visual tools, although other tools may be focused on in other example experiments. The restriction to the visual field allowed further investigation into alternative ways of displaying patient/procedure specific information in MR.

In the technological exploration part of the role-playing sessions, experts were presented with various ways of seeing what the novice sees. For example, the experts were presented with (1) a first person view from the novice's augmented reality headset; (2) multiple wide-angle and close-up views of the operating room, including a top-down view of the patient (see, e.g., the monitor setup on diagram 202 of FIG. 2); and (3) a static 3D model of the mannequin.

For the first person view, Microsoft HoloLens 1 and its internal live-streaming application were used. Due to processing power limitations, the video quality lowered and became "blocky" during sudden camera movements. Moreover, the resolution was low (1216×684) as compared to a modern cellphone video camera (1920×1080). In these example experiments/sessions, the other cameras consisted of Intel RealSense cameras and a Microsoft Kinect (v2) for the top-down view. For the static 3D model, a custom model of a mannequin in a Virtual Reality application on an HTC Vive headset was used.

First-Person View: In the example experiments/sessions, the experts valued seeing exactly what the novice was seeing. On expert elaborated on possible reasons. For procedures such as leg fasciotomy, for example, after the first incision, novice surgeons generally get so close to the leg that any external camera looking from behind or from the top would be occluded by them. One expert stated that "as a mentor, I would want a very good view of where they are retracting." Typically, only a video stream from the novices' perspective can show that.

External cameras looking at the patient body: In the example experiments, when away from the mock-up operating room, experts relied mostly on the first-person view. However, one expert, after observing the first-person view feed for a while, said that the video stream was "choppy" and that he would like the "ability to see what is happening in the room, even around the learner." As pointed out above, one of the technical limitations for first-person view cameras can be that as the novice surgeon moves around, the video stream may bounce with head movements and can decrease in quality (due to compression artifacts). When discussing possible locations for cameras, one expert mentioned the possibility of having a camera on wheels that an assisting nurse would be able to move around and re-position for per-procedure perspectives.

3D representation of the patient body: Most MR collaboration systems represent the novice's space on a flat screen (e.g., Microsoft Remote Assist). Before developing a real-time 3D reconstruction system, embodiments may endeavor to understand whether or not surgeons would be interested in interacting with a 3D representation of the body in Virtual Reality. In the example experiments, feedback on the reconstruction was positive, provided it was in real time and clear enough to show more than just anatomy. A three-dimensional representation could also allow for three-dimensional annotations.

What do mentors want to show mentees?: Modern telementoring and remote collaboration systems may augment the communication stream with deictic annotations. For example, certain technologies allows expert surgeons to annotate the novice's video stream or physical space. This allows them to highlight specific objects as well as describe actions. Certain research/works have shown that combining two or more visual cues such as gestures and annotations can have a significant positive impact on remote collaboration tasks. In the example experiments/role-playing sessions, a goal was to understand which visual cues could lead to better surgical collaboration between mentors and mentees. From the expert surgeons' perspective, this analysis answers the following questions: (1) What would help an expert best when guiding a novice surgeon?; (2) Do experts need to bring in external content such as surgical videos or 3D anatomy?; (3) Should novices see virtual surgical tools?; and (4) Where should novices see guidance information? The following paragraphs summarize this design exploration.

Pointing and sketching: In the example experiments, building upon their approach of showing anatomical landmarks and then marking incision lines, experts wanted the system to afford a similar approach. One expert envisioned pointing with his fingers while another expert suggested the use of virtual pointers, similar to a thin pencil.

Hand gestures: Hands and gestures may play a role in how experts communicate what to do next in a surgical procedure. Experts may not only use hands to point at a specific location on the patient's body, but they may also use gestures to enact different steps of the procedures. In the example experiments, this behavior was consistently observed even when experts were not mocking the procedures. For example, one expert was enacting the procedure with his hands while narrating out loud.

Overall, a virtual representation of hands can provide great versatility to surgeons as they use their hands to point, to demonstrate hand positioning/angling, to mimic tool behaviors (e.g. clamps and scissors), and to quickly enact different ways of performing the same procedure (e.g. showing with their hands different ways of doing a blunt dissection).

With more time spent with surgeons, embodiments may learn how critical these gestures are, not just because of their ability to show tool approaches and positioning techniques, but because surgery is fundamentally a physical act that cannot be easily verbalized. Many procedures rely on experts' tacit knowledge alongside their strong understandings of both spatial layout and physical properties of anatomy. These understandings may be difficult to convey verbally, but can be more easily communicated through physical gesturing.

Annotations in 3D: In the telementoring scenario, annotations can allow experts to communicate the location and length of incisions. One aspect of annotations for telementoring is the ability to communicate depth by drawing them in three-dimensions. In the example experiments, this became more clear when the experts telementored using existing MR collaboration technology such as Microsoft Remote Assist. Similar to other technologies, in Microsoft Remote Assist mentors can sketch on a tablet and these annotations are then projected (ray cast) to the closest surface in the mentee environment. One expert was particularly concerned with that since procedures such as leg fasciotomy have "a natural curve to it . . . " and he wasn't able to sketch that.

Tools may assist in more complicated scenarios: Most emergency procedures which were role-played in the example experiments required specialized tools such as clamps, scalpel, metzenbaum scissors, hooks, tracheostomy tubes, and others. Experts had mixed opinions on whether or not they should have access to equivalent virtual tools. Some experts thought that these tools could be enacted with their hands but only when the procedures were not "too complex."

Egocentric guidance: Easing the amount of cognitive workload on the novice was reinstated by experts several times during the example experiments. Easing the amount of cognitive workload placed on the novice surgeon may impact where information is displayed and how it is displayed. It may also but also impact how much control novices have over their MR interface. In the example experiments, the experts agreed that it was a good idea to give novices as little control as possible.

Educational content can support inexperienced surgeons: Mixed Reality technologies can create an opportunity to bring 3D representations of human anatomy as well as other multi-media content related to a novice's environment. In the example experiments, the experts mentioned that this could be useful when a novice has no familiarity with a procedure. While not the experts' main goal while telementoring trauma surgery, they expressed an interest in having access to a library of educational video clips that they could show novices. None of the experts expressed interest in showing 3D anatomy as—"it varies a lot from person to person, and standard models won't be helpful."

Summary of Example Experiments/Role-playing Sessions: In summary, the above described example experiments showed that when expert surgeons mentor novice surgeons, the experts focused on the following four goals: (1) watching the procedure from the novice's perspective; (2) showing the location of anatomical landmarks; (3) marking the location, length, and depth of incisions, suturing, or other actions; and (4) enacting the use of tools.

The experts expressed a desire for a system that enables experts to fulfill all four goals while also not overburdening novice surgeons. Novice surgeons may be already overwhelmed by the medical procedure at hand, and a new communication system shouldn't distract them from their main goal: keeping the patient alive.

The ARTEMIS System: After a 12-month long iterative design and development work that included rapid AR prototyping and role playing in collaboration with expert surgeons, an example Augmented Reality Technology-Enabled Remote Integrated Surgery (ARTEMIS) system was created in accordance with various embodiments of the presently disclosed technology. ARTEMIS may enable skilled surgeons and novices to work together in the same virtual space and approaches the problem of remote collaboration through a hybrid interface. Via this hybrid interface, expert surgeons in remote sites can use Virtual Reality to access a 3D reconstruction of a patient's body and instruct novice surgeons on complex procedures. In turn, novice surgeons in the field can focus on saving the patient's life while being guided through an intuitive Augmented Reality (AR) interface. As used herein, the expert interface of this ARTEMIS system may be referred to as ARTEMIS VR. The novice interface may be referred to as ARTEMIS AR. To contextualize certain implementation choices, this application may refer back to the Expert's Goals ("EG") when describing features of ARTEMIS AR or VR.

In various embodiments, a novice bedside environment may include (1) an Augmented Reality (AR) or Mixed Reality (MR) headset (e.g. Microsoft HoloLens) worn by the novice surgeon; (2) one or more depth cameras to capture the 3D Scene (e.g. one or more depth cameras, such as Microsoft Azure Kinect, placed on top of the bed and attached to the surgical lamp; one or more cameras on wheels to be moved around the operating room; and one or more cameras in the corners of the room); and (3) a motion capture system (e.g. OptiTrack) to track the movements of objects and people in the room. In some implementations, the cameras in the corners of the room may function as the Motion Capture system. The Motion Capture system may track the AR/MR headset, the depth cameras under the surgical lamp, as well as other objects of interest, such as the surgical table, The expert's remote environment may be equipped with a video-see-through Virtual Reality headset (e.g. HTC Vive Pro, Oculus Quest 2) with or without a wireless adapter that can make it untethered, hand+finger tracking for the expert surgeon based on IMU-equipped gloves or computer vision, a specialized pen controller used for annotations and VR-based interactions, and a Motion Capture system such as the OptiTrack optical marker system to track the movements of objects and people in the room (markers may be attached to the VR, surgical table proxy, gloves, and wireless pen).

Figure 5:
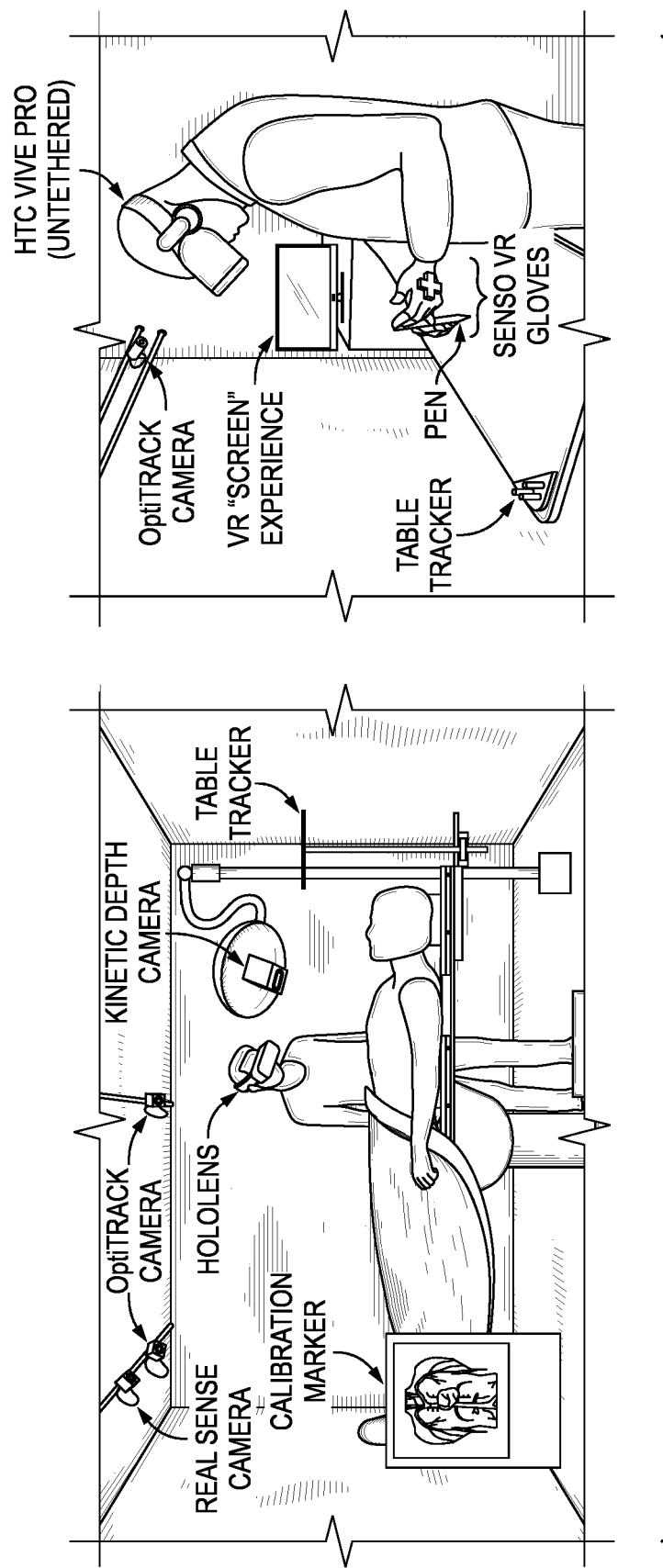
FIG. 5 depicts images from example experiments conducted in accordance with embodiments of the disclosed technology.

FIG. 5 shows ARTEMIS in action during an example evaluation study, and outlines the devices used for both ARTEMIS AR and ARTEMIS VR.

Novice Surgeon's Interface: To avoid distracting the novice surgeon while operating, the ARTEMIS AR interface components may be designed to be relatively passive. For example, in various embodiments the novice surgeon may not be able to directly interact with the interface. Accordingly, the features described below may be controlled remotely by the expert. For instance if a novice needs to hide annotations or play a procedure clip, the novice can request the expert surgeon to do so. This feature emerged from the example experiments/role-playing sessions where it was observed that novices had trouble directly interacting with an AR application while operating on a patient. Accordingly, the novice surgeon's interface may be designed in a manner which does not overwhelm the novice surgeons nor distract them from their operating tasks.

In certain embodiments, the novice surgeons may be able to see three main holographic representations in front of them: (a) the expert's avatar and hands, (b) a remote pen and 3D annotations, and (c) procedural video clips (see FIG. 4). In addition, the novice surgeon may be able to provide direct views of the patient and the surgery to the remote expert, by manipulating the position of the Kinect camera and by directly attending to regions of interest with the HoloLens device's camera.

Expert's Avatar and Hands: The novice surgeon can see both the expert surgeon's location and their hands (see diagram 402 of FIG. 4). This may enable the expert surgeon to communicate through gestures, for example, by pointing to a location on the patient body or by demonstrating how to handle a surgical tool. The expert surgeon's avatar may automatically disappear if the novice surgeon walks into their virtual location. This interaction may allow the novice surgeon to repeat what the expert surgeon is gesturing in a more intuitive way as the two surgeons share a point of view. In other words, the expert surgeon's hands can act as a second pair of hands that originate from the novice surgeon's body and guide the novice step-by-step.

3D Pen and Annotations: 3D annotations (see, e.g. diagram 404 of FIG. 4) may allow expert surgeons to instruct the novice by 3D sketching over a patient's body. Because these annotations are in 3D, the annotations can directly communicate depth, length, and area, which may be important for surgical procedures such as incisions, tracheotomies, thoracotomies, etc. To allow for additional interaction space for the remote expert, 3D annotations can also happen in mid-air and may not be limited to the patient's body. To facilitate the novice surgeon's understanding of where the annotations will show up, if the remote surgeon is holding a pen, ARTEMIS AR may show a 3D model of the pen. This may be the same 3D pen that expert surgeons sees in their VR interface. This pen may be shown in the hands of the expert surgeon's avatar when in use.

Procedure video clips: Procedure clips may be an additional resource used to support guidance during remote telementoring. These clips can be instructional, short video clips of different steps of specific surgical procedures that are available for the expert to show to the novice when needed (see e.g. diagram 406 of FIG. 4). These video clips may show up as a floating screen on top of surgical table (see FIG. 1) and may face the novice surgeon. The video clips can keep repeating until disabled by the expert, and may contain audio instructions, that can be muted by the expert surgeon if needed.

Scanning the patient through the surgical lamp: Various embodiments (e.g. ARTEMIS) may show a 3D reconstruction of the patient to the expert surgeon in Virtual Reality (see e.g., diagram 308 of FIG. 3). To provide an intuitive interface that allows the novice surgeon to both know what the expert surgeon can see, and easily change that view as needed, embodiments may be designed to take advantage of an operating room layout. Accordingly, in various embodiments one or more depth cameras may be attached to an operating room surgical lamp that is illuminating the patient (see e.g., diagram 502 of FIG. 5). In this way, the novice surgeon may be aware of what the expert surgeon can see as the lamp illuminates that part of the patient.

Figure 3:
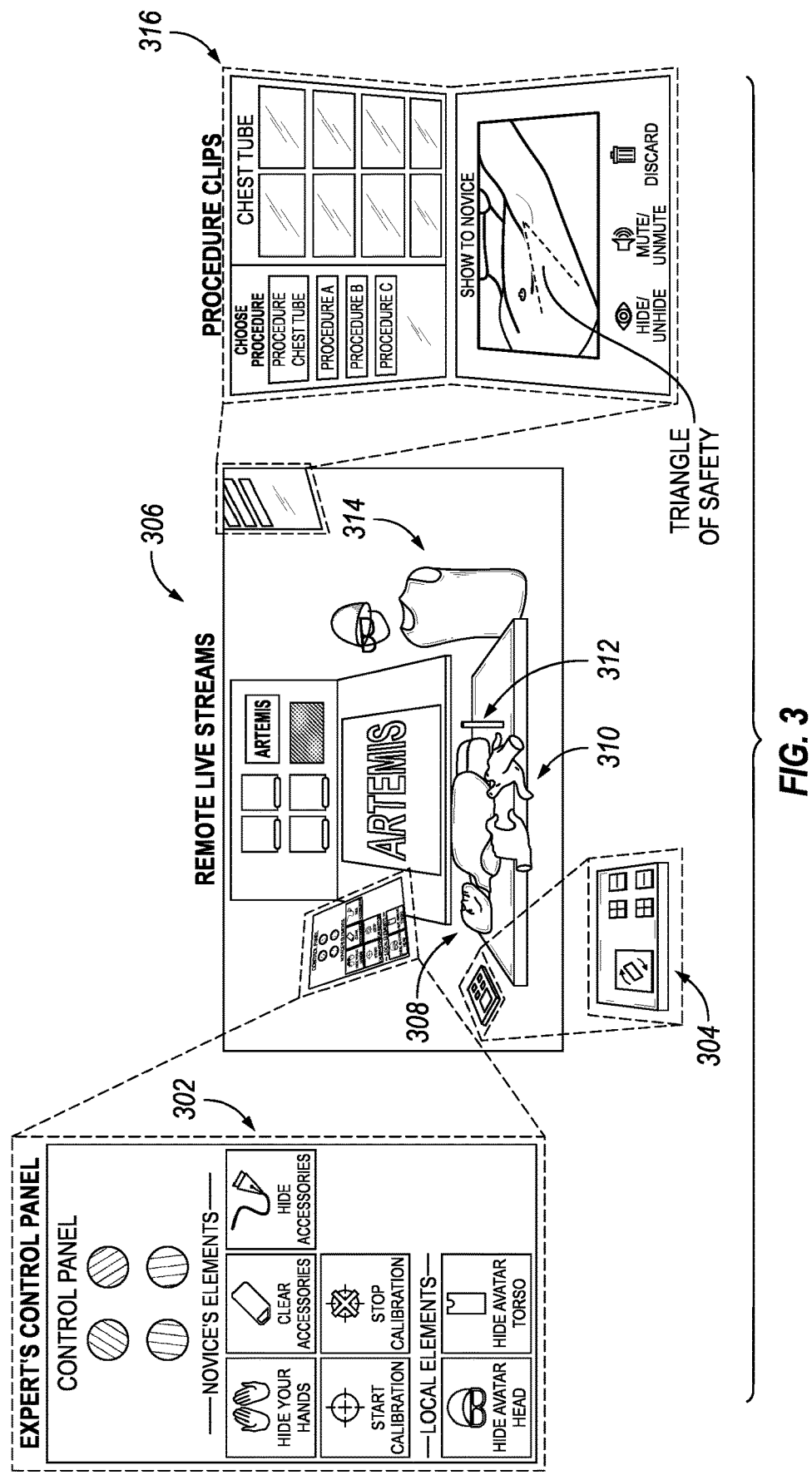
FIG. 3 depicts a series of diagrams illustrating an example mixed-reality system for immersive surgical telementoring, in accordance with embodiments of the disclosed technology.

Expert Surgeon's Interface: The expert surgeon's Virtual Reality interface may provide surgeons with a virtual operating room. In this operating room, the 3D reconstruction of the patient can be at the center of the stage, surrounded by tools and VR camera views (from, e.g., Kinect, RealSense and HoloLens cameras) designed to make the expert surgeons' interaction with ARTEMIS more efficient, and enable the expert to successfully explain procedural and conceptual steps of the surgery being performed. FIG. 3 illustrates an example VR interface and highlights various components.

The expert surgeon may interact with the interface via a laser pointer, but unlike most VR experiences, this laser pointer may be implemented through an actual physical pen, and not as a virtual tool that they "grab" with VR controllers. Thus, instead of having users learn how to map controller buttons to gestures and actions, in certain embodiments the expert surgeons may wear real gloves as if they were wearing surgical gloves (see, e.g., diagram 602 of FIG. 6). In these embodiments, the surgeon's only surgical tool may be a pen that they can hold and feel with their hands, and can point, select, or draw (see, e.g., diagram 604 of FIG. 6). To facilitate the use of hand gestures and tools by an expert surgeon, these embodiments do not use regular VR controllers. Instead, they use a specialized pen controller. However, other embodiments may use regular VR controllers or other specialized controllers such as modifications of surgical tools.

Control Panel: The expert's control panel (see, e.g. diagram 302 of FIG. 3) may provide various types of tools. These tools may include any one, or combination of: (i) annotation controls and color palette, (ii) local space controls, (iii) novice surgeon's interface controls, and (iv) calibration controls. Through the annotation controls and color palette, the expert surgeons can change the color of the pen before making a 3D annotation. The experts can also erase annotations on both their side and the novice surgeon's side. The local space controls (see, e.g. diagram 302 of FIG. 3) may allow experts to show and hide the novice's head or torso. The Novice surgeon's interface controls may allow experts to change the visibility of their hands and annotations on the novice surgeon's space. Calibration controls can allow experts to work with the novice surgeon to improve the alignment of annotations as seen from the novice surgeon's side. Certain of these features will be described in greater detail below.

Table Control: The table control interface can serve multiple purposes (see, e.g. diagram 304 of FIG. 3). For example, the Rotate Table may flip the orientation of the patient so that the expert surgeon can look at surgical field from two different points of view. In another example, the Gain and Exposure controls may allow the expert surgeon to control settings of the remote Kinect camera, adjusting the visibility of the patient as needed.

Remote Live Streams: The remove live streams interface (see, e.g. diagram 306 of FIG. 3) may shows various live video streams to the expert surgeon. In the example depicted by FIG. 3, two displays show cameras attached to rolling wheels that the novice surgeon can move around the operating room; two displays show cameras located at opposite corners of the operating room; one display shows the internal camera of the head-mounted display; and one display shows the patient as seen by the depth camera attached to the surgical lamp. The expert surgeon can use the pen as a laser pointer to select and show any of these six videos streams in the bigger display at the bottom. The location and layout of these displays may allow for the user to see both the patient reconstruction as well as the video displayed in the bigger screen without the need to switch focus or move their heads. It should also be understood that embodiments may use more or less displays depending on the number of remote streams available.

3D Patient Reconstruction: The 3D Patient Reconstruction interface may be available to the expert surgeon to guide the novice through specific surgical procedures (see, e.g. diagram 308 of FIG. 3). Through a point-cloud view, the expert surgeon can see the patient in a three-dimensional rendering that keeps real-world proportions. The point cloud view may be a real-world live representation of the patient that may be placed on top of an actual table in the remote expert's environment. By looking at the point cloud, the expert can see in real-time what is happening to the patient. The expert can also interact with the patient representation by placing hands on particular parts of the body, and by annotating the body using 3D annotations. Both hand maneuvers and 3D annotations may show up in real-time in the AR view of the novice. Novice Surgeon's Avatar: The novice's avatar (see, e.g. diagram 312 of FIG. 3) may show the location of the novice surgeon with respect to the surgical table at all times. Experts can use the avatar as a communication and interaction anchor when guiding the novice through their procedures.

Procedure Clips Control: The procedure clips control interface may provide a video library containing a number of surgical procedure video clips for different procedures (see, e.g. diagram 314 of FIG. 3). By selecting one of the options, a series of video clips may pop up on the right side of the interface (for instance the chest tube procedure). When an expert surgeon selects one of these video clips, it may display on the larger screen at the bottom of the interface. It can play synchronously on both the expert side in VR, and as holographic representations on the novice surgeon's side (see, e.g. diagram 406 of FIG. 4). The expert surgeon can show, hide, pause, mute, and remove this interface from both the expert's and the novice's side.

Figure 7:
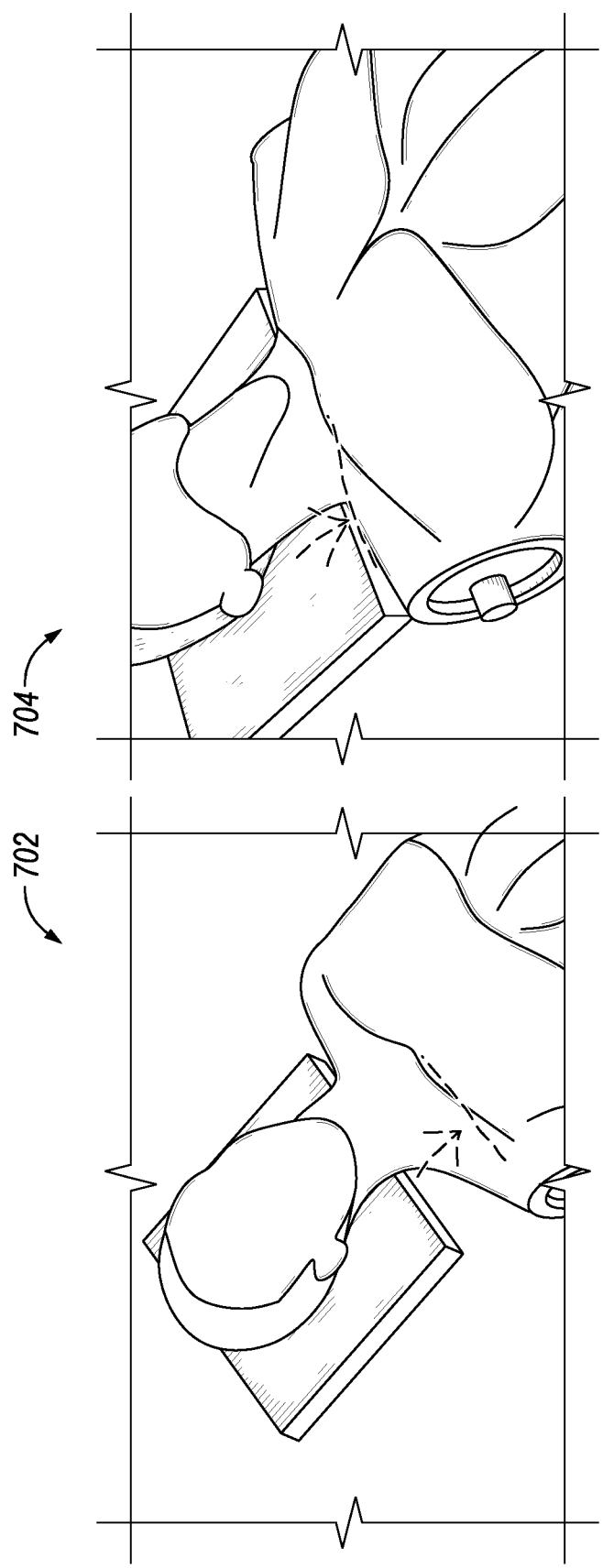
FIG. 7 depicts a series of diagrams illustrating an example mixed-reality system for immersive surgical telementoring, in accordance with embodiments of the disclosed technology.

Calibrating 3D Annotations: Because novice surgeons may only see the 3D annotations floating in front of them (see, e.g. diagram 704 of FIG. 7), annotations displayed at the wrong location can lead them to perform an action (i.e. an incision on the patient's body) at the wrong place. To avoid this, before starting a procedure, expert surgeons can use the calibration buttons in the Control Panel (see, e.g. diagram 302 of FIG. 3) to calibrate the novice surgeon's head-mounted display. Various calibration approaches may be used. As one example, the novice surgeon may bring a Calibration Marker (see, e.g. FIG. 9) under the surgical lamp view. The expert surgeon may then select "Start Calibrating" in the Control Panel (see, e.g. diagram 302 of FIG. 3). When the novice surgeon looks at the calibration marker through the HoloLens camera, the system may perform a calibration between the different tracking devices. The expert surgeon can confirm alignment accuracy by annotating over the calibration marker. In other examples, calibration may be performed without any buttons being pressed.

Figure 8:
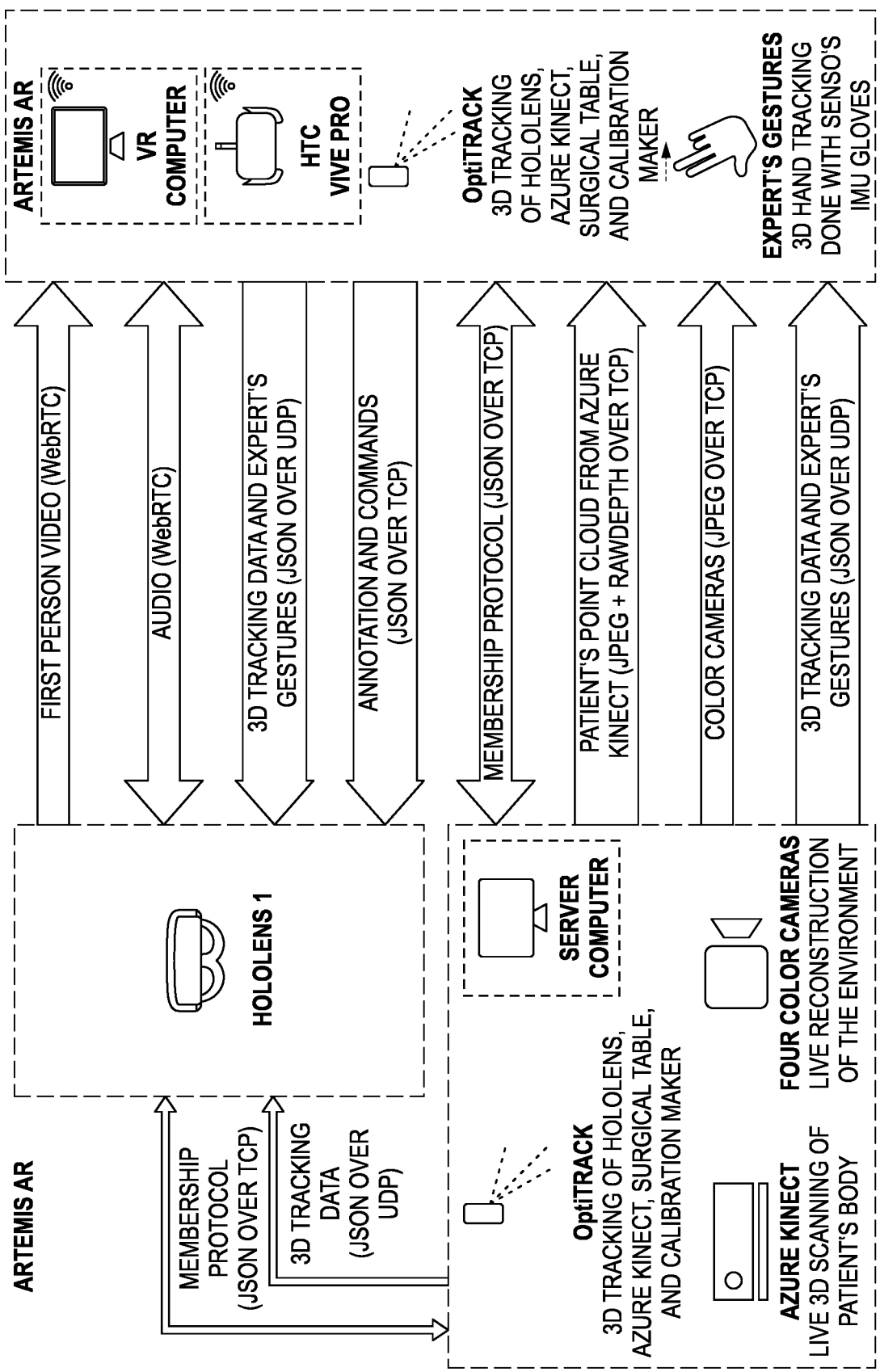
FIG. 8 depicts a diagram illustrating an example mixed-reality system for immersive surgical telementoring, in accordance with embodiments of the disclosed technology.

Implementation: As described above, ARTEMIS may consist of two separate spaces: ARTEMIS AR and ARTEMIS VR. ARTEMIS AR may encompass the novice surgeon's AR head-mounted display and the server that connects to the cameras and trackers in the operating room. ARTEMIS VR may encompass the tracking hardware used for the expert surgeon. Each computing device (e.g. HoloLens v1, Server Computer, VR computer, etc.) can run an application developed in Unity 2018.3. FIG. 8 illustrates example hardware and streams of data which may be used with ARTEMIS.

In various embodiments, ARTEMIS AR may use a Mixed Reality or Augmented Reality headset such as HoloLens v1 or HoloLens v2 (referred to as the AR headset) and a standalone computer (Server Computer). The AR headset can send audio and video directly to ARTEMIS VR through real-time streaming technology such as WebRTC or equivalent. The AR headset may also receive tracking data and commands from the VR computer. Certain embodiments may use a separate computer, e.g. the Server Computer, to encode and stream data from the cameras installed in the operating room. One or more depth cameras such as Microsoft Azure Kinect be used to create the patient's point cloud at a resolution of 1280×720, 30 fps or higher. The Server Computer may also encode and stream frames from one or more Intel RealSense color cameras (e.g., 2 on rolling wheels, 2 in the corners of the room) at a resolution of 800×600 or more. Embodiments may also use Motion Capture cameras such as several OptiTrack Prime 13 motion capture cameras to cover the entire surgical space. These cameras can track the AR headset, the surgical table, the surgical lamp, and the calibration marker (if used) to realign annotations. Tracking data from these cameras may flow from a Motion Capture system such as OptiTrack's Motive to the Server Computer and then to both the HoloLens, or any Augmented Reality headset, and the VR Computer through a custom protocol (see, e.g. diagram 802 of FIG. 8).

In some embodiments, ARTEMIS VR may use an untethered HTC Vive Pro as the VR headset. Similar to the AR space, it can also use OptiTrack motion capture cameras to track the VR headset, the pen, the gloves, and a physical table that serves as a proxy to the surgical table (FIG. 6 shows the spherical passive infrared OptiTrack reflectors attached to the gloves and the pen). Both the pen and the gloves may be commodity hardware that connect to the VR computer through bluetooth. Various embodiments may use OptiTrack's active Vive tracker to track the VR headset instead of using Vive's default tracking technology.

When developing various embodiments such as ARTEMIS, certain technical challenges were faced. These challenges include: (1) HoloLens' limitations; (2) frequent change of input and interaction; (3) rendering the point-cloud without distortions, and (4) calibrating the different coordinate systems. The following paragraphs will describe example software and hardware strategies that may be used to address these challenges.

Overcoming Limitations with HoloLens: Released to the public in 2016, HoloLens v1 was the first commercial, untethered optical see-through head-mounted display to use inside-out global sensor fusion for head-tracking. However, HoloLens' integration with external tracking systems such as OptiTrack may be quite challenging, especially when HoloLens' internal tracking system drifts over time. To check that devices are properly integrated and therefore ensure smooth user experience, various embodiments such as ARTEMIS include an interface for the expert surgeon and the novice surgeon to verify that OptiTrack-HoloLens calibration is accurate.

As an untethered device, HoloLens v1 typically runs on a battery that lasts around 2-3 hours during continuous use. However, the expert surgeons from the example experiments/role-playing sessions were concerned that some procedures could last longer than that. To allow surgeons to quickly switch to a new device, each device may connect to the Server Computer that acts as a hub and advertises that a new AR/VR display is available. This may allow a newly connected HoloLens to quickly take over an existing session when a device is about to run out of battery.

As an embedded computer, HoloLens also may have limited processing power. For example, certain procedure clips (see, e.g. diagram 314 of FIG. 3) may not be able to play while WebRTC is encoding and streaming the front-facing camera. To resolve this problem, various embodiments disable the first-person view whenever the expert surgeon plays a procedure clip. In these situations, the expert surgeon may rely on the other cameras to gather more visual information of what the novice surgeon is doing.

Rapid Technology Integration: An example ARTEMIS system was implemented in accordance with various embodiments. This example system was tested over a period of 12 months. During this time, different commodity technologies were tested to address the interaction needs which were uncovered during the example experiments/role-playing sessions with experts. AR and VR technologies are still maturing and off-the-shelf products have limitations that only show up through extensive testing. For example, certain example embodiments initially integrated Leap Motion on the VR headset to track the expert hands, but example tests showed that Leap Motion may fail with different gestures when fingers overlap each other. As a result, certain embodiments may instead integrate VR gloves as a replacement for Leap Motion. Some embodiments may be upgraded again to a computer vision hand tracking system.

Sometimes, switching from one commercial technology to another can mean migrating to a new Software Development Kit (SDK) with different programming language or environment support. To facilitate rapid-technology integration, various embodiments may implement abstraction layers so that the expected data from each side can be independent of the hardware and software used. For example, a point-cloud may be encoded as JPEG and Raw 16 bits depth. Some embodiments may use a networking library to connect and synchronize data streams across systems.

Networking Library: Unity may have poor support for custom, high-throughput networking protocols. With relevant data going and coming through the network, certain embodiments may implement a networking library for Unity with support for Python, C++, and other platforms such as NodeJS. The Unity counterpart of the library may provide a high-level interface to TCP clients and TCP servers as well as UDP sockets. It may also receive and decode network packets in an external thread to avoid impacting rendering performance. With the exception of the WebRTC audio and video streams, various example embodiments have implemented all the network streams illustrated in FIG. 8 with this library.

Rendering the Point-Cloud: Example embodiments may be implemented using a custom application to read, encode and stream color and depth frames from Kinect Azure. Color frames may be encoded into JPEGs and depth frames can be sent raw through a C++ interface part of a networking library. On the VR application, custom shader may be used to render color and depth frames as a point cloud (see, e.g. diagram 702 of FIG. 7). The shader may use a pre-computed look-up table to calculate the point-cloud from the depth map similar to Azure Kinect Fast Point Cloud example.

The AR space may track both the surgical table and the surgical lamp equipped with an ARTEMIS depth camera. The novice surgeon can move the camera around the patient, and the expert surgeon may see the different parts of the patient at different locations on their virtual surgical table. Moving the surgical table and the lamp together may not move the virtual surgical table nor the patient point-cloud in VR.

Figure 9:
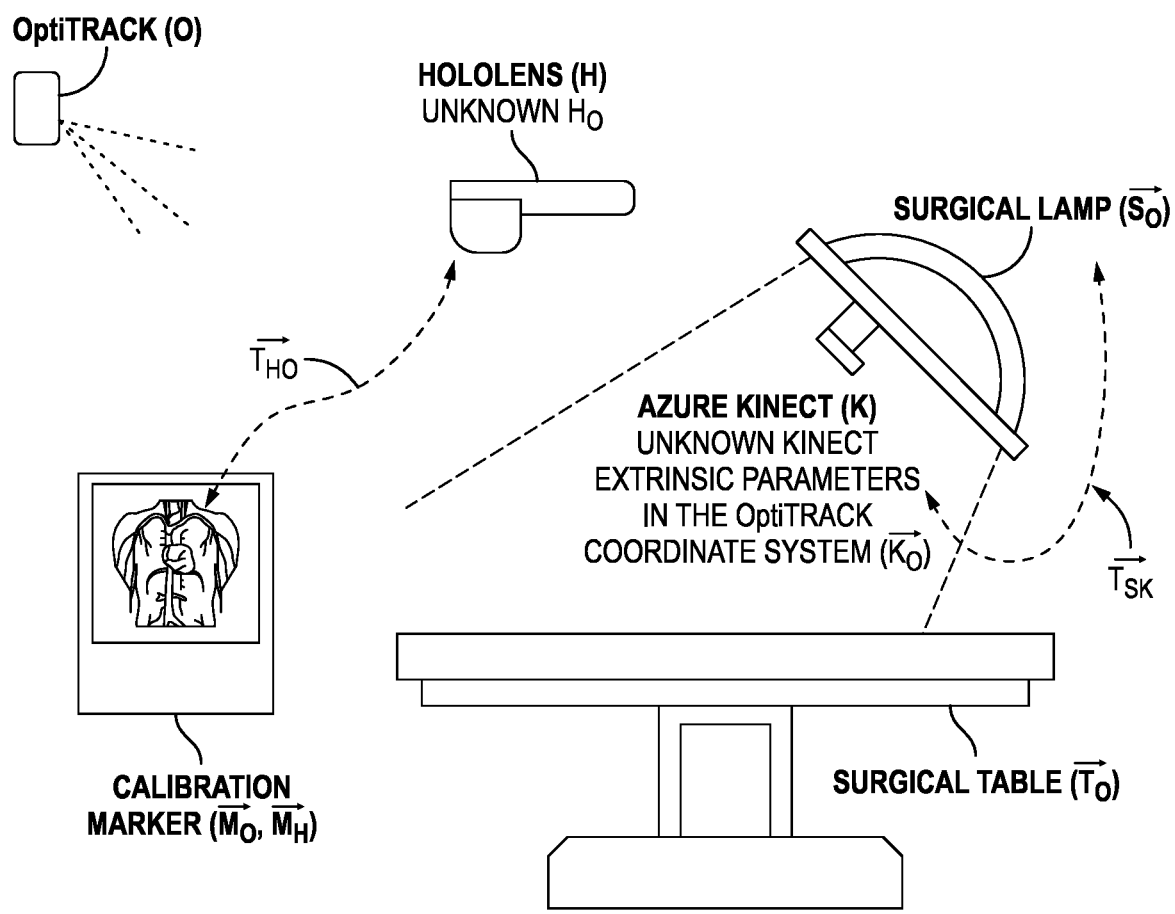
FIG. 9 depicts a diagram illustrating an example mixed-reality system for immersive surgical telementoring, in accordance with embodiments of the disclosed technology.

Calibrating Different Coordinate Systems: Showing annotations on the patient's body may require knowledge of the patient's location with respect to the HoloLens coordinate system. Unfortunately, HoloLens may be unable to directly track the body of the patient. Accordingly, various embodiments may rely on OptiTrack to track both the patient and HoloLens so that HoloLens can translate incoming annotations from the patient's body coordinate system to its internal coordinate system. Different example coordinate systems and required transformations are illustrated in FIG. 9. Overall, there may be two main transformations required.

The first step can be to establish a coordinate system for the patient's body. This may requires a single, offline calibration between Azure Kinect and OptiTrack. This calibration may be performed using one camera instead of using a stereo setup. This calibration may give us $K_O$, the location of Azure Kinect with respect to the OptiTrack coordinate system (O). Given that Kinect may not be directly tracked by OptiTrack, during calibration, embodiments can use the surgical lamp location ($S_O$) to find a transformation between itself and Kinect ($T_{SK}$). $T_{SK}$ may allow embodiments to know the location of Kinect at all times, even after a surgeon moves the surgical lamp.

The second step can be to find $H_O$—HoloLens' location with respect to OptiTrack (O). Unfortunately, HoloLens' internal tracking system may reset its origin every time ARTEMIS AR is started. This may requires embodiments to find $T_{HO}$ every time the system is started. To facilitate calculation $M_H$, embodiments may utilize a Calibration Marker that can be tracked both by OptiTrack and HoloLens. Vuforia may be used on HoloLens to track the marker through its front-facing camera. With known equivalent points $M_H$ and $M_O$ embodiments can find a transformation between HoloLens and Optitrack $T_{HO}$.

System Evaluation: In accordance with various embodiments, ARTEMIS was prospectively evaluated within a cadaveric trauma model. Accordingly, in an example/proof-of-concept, deployment novices were randomly assigned to an ARTEMIS support or a Control group (audio only consultation), and evaluation was performed retrospectively by experts blinded to the study participants group (as all participants wore a headset platform) using standardized graduate medical education methodology. Key outcome measures may be viewed as surgical technique (evaluated using the OSATS tool), critical decision making, and timeliness of life saving interventions.

In this example deployment, a qualitative evaluation of the use of ARTEMIS was performed involving 5 experts, 6 novices and 22 procedures on mannequins and cadavers.

Procedures: As part of the example deployment of ARTEMIS at Naval Medical Center San Diego the following individuals were enrolled: 6 novices and 5 experts to work with the novices. Together the experts and novices participated in pilot studies with mannequins, as well as actual studies with cadavers. A research team engaged in direct observation, and all participants were video recorded. Direct observations from cadaver studies were used in conjunction with videos from mannequin studies. The study protocol was approved by the Naval Medical Center San Diego Institutional Review Board in compliance with all applicable federal regulations governing the protection of human subjects.

Of the five experts enrolled in the example deployment, two were Senior Critical Care Intensivists, and three were Staff Surgeons. The six novices were Surgical Technicians, Medics, and Junior Surgical Residents. One of the experts mentored two different novices.

The five experts engaged in a total of 22 procedures across all of the sessions with novices, with two novices only performing one procedure (cricothyroidotomy), and the other four performing five back-to-back procedures each (cricothyroidotomy, dual-incision leg fasciotomy, femoral artery exposure, axillary artery exposure, and resuscitative thoracotomy). Procedures on mannequins did not entail any actual incision, while cadaver studies performed the procedure as if it was on a real patient. All but one expert, and all novices were trained on the system, but neither experts nor novices knew in advance the procedure to perform. Sessions covering one to five procedures spanned 15-60 min. All experts and novices had the VR/AR headsets (HTC Vive Pro and HoloLens 1) calibrated for their inter-pupillary distance (IPDs).

The research team was composed of at least three researchers (sometimes four) who observed all the sessions, took notes, and analyzed the videos of the procedures to uncover usability issues, usage patterns, communication and coordination processes specific to immersive remote telementoring. Experts and novices were also informally interviewed at the end of their session to gather their feedback on the use of the system. Results from this initial qualitative evaluation are summarized in subsequent paragraphs. To structure the results as presented below, a qualitative synthesis was conducted through a thematic analysis that aggregated observations from videos, interviews, and researcher notes.

Results and Discussion: In the example deployment of ARTEMIS, the researchers observed that both novices and experts were able to communicate with increased precision, accuracy, and clarity. Novices were able to successfully complete the procedures assigned to their sessions, including those that they had never performed previously. The overall feedback from experts when asked about the system is nicely summarized by one expert's comment that "No do those 5 procedures in 40 minutes, especially 2 of which he's never done before . . . is pretty great."

After reviewing the data collected during an exploratory evaluation, the researchers organized their findings into seven major themes. The first three themes may cover technology limitations and interaction limitations. The last four may illustrate how ARTEMIS enabled experts to overcome those limitations, and how the system accommodated for different mentoring styles.

(1) The 3D point cloud: 3D point clouds may be as reliable as the depth information associated with each pixel. In situations where experts needed a closer look of the body, novices moved the surgical lamp supporting the depth camera to cover distant parts of the body (e.g. the legs during a fasciotomy), as well as to have better views (e.g. the side of the chest during a lateral puncture). Modern depth cameras can still have a gap in resolution between the depth camera and the color camera. Overall, the researchers found that point-clouds may be unable to represent finer details such as veins and soft tissue such as the fascia.

(2) Annotations' depth and alignment: In the example deployment of ARTEMIS, one of the most difficult tasks for both experts and novices was to understand how to make annotations at the right depth (expert in VR) and at what depth annotations were done (novice in AR). Experts using VR for the first time had some difficulty making annotations at the right depth. This difficulty with the interface may be partially due to depth perception in VR. VR headsets can still be limited in how they model and create depth perception. In the example deployment of ARTEMIS, researchers had to explain to one expert that they were writing annotations far above the actual 3D body because they were looking at the body from the top. While the researchers tackled this limitation by training the expert surgeons, a future venue of exploration may be the use of visual aids and sketching constraints.

(3) Sharing between the VR and AR: During the first tests, one expert tried to guide the novice surgeon by referring to one of the many video clips visible to him on the procedure clips library interface (see, e.g., diagram 316 of FIG. 3). It took the expert some time to realize that the novice was only able to see one selected video, and not the entire video library. This expert was not trained on ARTEMIS as other experts, and did not realize that the AR and VR user interfaces are quite different. In addition, given this expert was already quite experienced in collaborative VR interfaces, he was expecting similar interfaces as the ones he experienced in the past. A related experience could happen if the expert surgeon points to the position in space where the video library is located in VR, to refer to the currently playing video in AR. The location of the video player on the AR side may not necessarily be the same as the location on the VR side, and therefore the pointing gestures may be less effective. In situations like these, it can be important to not take the user interface for granted, and train even the most experienced AR/VR users. In addition, to solve unbalanced interfaces, embodiments may intervene and "warp deixis" by changing pointing gestures so that they align with what users see in their environments.

Despite these limitations observed in the example deployment of ARTEMIS, researchers observed that ARTEMIS' different communication features may serve as a way to overcome technical limitations.
- (4) Interactions between expert and novice surgeons: ARTEMIS can allow experts to (virtually) move around the operating room, but they mostly stayed at same remote location as the novice surgeon. This observation resonates with works that investigated the impact of giving view independence to remote mentors. For example, certain works touch upon a similar observation where experts commented on the ease of guiding someone by offering a first-person perspective with their own hands. This not only allowed them to benefit from seeing the 3D reconstruction from the same perspective as the novice, but it also facilitated enacting the procedure from the novice's perspective, something that experts can't do even when working with novices side-by-side.
- (5) Alternating between watching the novice's first-person view and sketching on 3D reconstruction: In the example deployment of ARTEMIS, most experts were initially expecting the 3D reconstruction to be as detailed as a video feed or as a real-patient. As described above, point cloud renders may be unable to represent small details such as veins inside cadavers. Resolution (especially within body cavities) is something that continued to be improved with iterative updates. Nonetheless, by providing more than a single of view of the body, the example deployment of ARTEMIS allowed experts to overcome this potential limitation while still benefiting from the 3D annotation interface. For example, after the initial incision was made, experts would alternate between watching the first-person view of the novice to gather context of what they were doing, then looking at the 3D reconstruction whenever they needed to show a maneuver with their hands or make more markings.
- (6) Verbalization and context can help overcome visual alignment issues in AR: Similar to other AR systems, annotations in the example deployment of ARTEMIS as seen by the novices were often not perfectly aligned with the cadaver, sometimes being off by up to 1-2 cm. Interestingly the expert and novice were often able to smoothly account for this—using verbal communication, hand gestures and body landmarks to resolve alignment problems. For instance, in one of the sessions where annotations were not perfectly aligned, one expert directly asked a novice for her feedback. Another expert-novice dyad learned that by standing over the body from a similar point-of-view, they could align annotations better. This helped them deal with the lack of depth cues in virtual spaces such as the lack of occlusion of the annotation by the patient body. Users were able to resolve possible annotation positioning problems, by talking through them and using hands movements to better explain.
- (7) Digital Whiteboard: In most telementoring systems, experts annotate a video interface to contextualize the instructions they want to convey—for example, by marking the location of an incision. For instance, during the example experiments/role-playing sessions described above, experts annotated the body to show the location of anatomical landmarks as well as mark the location, length, and depth of incisions. In addressing these two goals, ARTEMIS' interface may be centered around 3D annotations on the patient body. In previous telementoring systems, however, experts could use the video interface to make annotations that are unrelated to the patient body. For example, they might want to explain a technical concept or describe future steps of the procedure. During the example deployment of ARTEMIS, a couple of experts asked for additional shared writing supports. For example, one expert mentioned how he "would like to have a whiteboard so that I can make pauses and explain steps." While this could inspire a new feature for ARTEMIS, researchers observed how most experts relied on annotations over the virtual body. The researchers also noticed that the lack of a digital whiteboard did not constrain experts. For example, one expert used the space above the patient to create 3D mid-air handwritten notes that the novices were able to read and act upon.

Conclusion and Potential Future Work: Embodiments of the presently disclosed technology such as ARTEMIS may provide a Mixed-Reality system for immersive surgical telementoring. Through a participatory design process with expert surgeons, experiments conducted in accordance with various embodiments explored the use of Mixed Reality technology in a collaborative surgical task and defined four design goals that systems may address to better support expert surgeons' needs. Embodiments such as ARTEMIS may address these goals to create a high-fidelity remote collaboration environment for time-critical environments. Through a qualitative evaluation, researchers observed that ARTEMIS may allow untrained medical personnel to respond to an emergency, and to perform complex surgeries on critical patients under direct guidance from remote experts. The qualitative evaluation of ARTEMIS in a real-world surgery scenario outlined a number of aspects that may be instructive for the further development of immersive collaborative environments for time-critical applications.

While telementoring for trauma care was a primary use of ARTEMIS, embodiments may be generalized to remote physical collaboration that requires a high-degree of fidelity and accuracy (down to the centimeter scale). Unlike previous systems that support physical task mentoring through a single, complex interface for both mentors and mentees, ARTEMIS can provide specialized interfaces that allow mentors in VR to control what mentees immersed in AR can see so that mentees can focus on the task at hand.

While much can be achieved in the future with a system like ARTEMIS, a role of certain embodiments may be to allow researchers to understand the unique needs of surgical collaboration in trauma settings as well as the impact of new mixed-reality technology for collaborative environments, specifically investigating the development of common ground, collaboration, and communication.

In the future, along with conducting a formal evaluation comparing ARTEMIS with other telementoring systems, embodiments may be refined for mobile immersive AR and VR to enable 3D real-time telementoring. For example, embodiments may scale and support time-critical tasks that require co-presence of experts alongside novices. In another example, embodiments may be studied from the perspective of the novice surgeon. Additional clinical evaluations conducted in accordance with embodiments may help to uncover unknown mentees' needs that would further improve an understanding of how a system such as ARTEMIS can provide remote guidance to novice surgeons.

FIG. 10 depicts an example computing system 1000 that may be used to facilitate collaborative telementoring, in accordance with various embodiments of the presently disclosed technology.

Referring now to FIG. 10, computing components 1010 may be, for example, one or more server computers, controllers, or any other similar computing components capable of operating together and processing data. In the example implementation of FIG. 10, the computing components 1010 include hardware processors 1012, and machine-readable storage medium 1014.

Hardware processors 1012 may be one or more central processing units (CPUs), semiconductor-based microprocessors, and/or other hardware devices suitable for retrieval and execution of instructions stored in machine-readable storage medium 1014. Hardware processors 1012 may fetch, decode, and execute instructions, such as instructions 1016-1022, to control processes or operations for burst preloading for available bandwidth estimation. As an alternative or in addition to retrieving and executing instructions, hardware processors 1012 may include one or more electronic circuits that include electronic components for performing the functionality of one or more instructions, such as a field programmable gate array (FPGA), application specific integrated circuit (ASIC), or other electronic circuits.

The machine-readable storage medium, such as machine-readable storage medium 1014, may be any electronic, magnetic, optical, or other physical storage device(s) that contain or store executable instructions. Thus, machine-readable storage medium 1014 may be, for example, Random Access Memory (RAM), non-volatile RAM (NVRAM), Electrically Erasable Programmable Read-Only Memory (EEPROM), storage device(s), optical disc(s), and the like. In some examples, machine-readable storage medium 1014 may be non-transitory storage medium, where the term "non-transitory" does not encompass transitory propagating indicators. Machine-readable storage medium 1014 may be encoded with executable instructions, for example, instructions 1016-1022.

As described above, computing system 1000 may be used to facilitate collaborative telementoring, in accordance with various embodiments of the presently disclosed technology.

Accordingly, hardware processors 1012 may execute instruction 1016 to obtain, from a depth camera located in a first geographic location, 3D images of a surgical subject located in the first geographic location. As alluded to above, the first geographic location may be an operating room where a novice surgeon is performing surgery. The surgical subject may be various types of entities that can be operated on including a human or animal, a cadaver, a mannequin used for performing practice surgeries, etc.

As alluded to above (and as will be described in conjunction with instruction 1018), the 3D images of the surgical subject obtained by the depth camera may be used to generate/display a 3D virtual reconstruction the surgical subject on a head-mounted virtual reality (VR) display worn by a first person (e.g., an expert surgeon) located in a second geographical location.

As alluded to above, to provide an intuitive interface that allows a novice surgeon to both know what the first person (e.g., the expert surgeon) can see, and easily change that view as needed, embodiments may be designed to take advantage of an operating room layout. Accordingly, in various embodiments the depth camera may be attached to an operating room surgical lamp that is illuminating the surgical subject (see e.g., diagram 502 of FIG. 5). In this way, the novice surgeon may be aware of what the first person (e.g., the expert surgeon) can see as the lamp illuminates that part of the surgical subject. The novice surgeon can also intuitively ensure that the depth camera obtains 3D images of an anatomical region of interest on the surgical subject by moving the surgical lamp in a manner they typically would during a surgery (i.e., to illuminate the anatomical region of interest).

Hardware processors 1012 may execute instruction 1018 to display, on a head-mounted VR display worn by a first person in a second geographic location, a 3D virtual reconstruction of the surgical subject based on the obtained 3D images of the surgical subject (in certain examples, the VR display worn by the first person in the second geographic location may be an AR display). The 3D virtual reconstruction of the surgical subject may be a 3D virtual reconstruction of the entire surgical subject or some portion/anatomical region of the surgical subject. Here, the first person may be an expert surgeon providing instruction/telementoring to a second person (e.g., the novice surgeon) located at the first geographic location.

As alluded to above, the 3D virtual reconstruction of the surgical subject may be available to the first person (e.g., the expert surgeon) to guide a novice surgeon located at the first geographic location through specific surgical procedures (see, e.g. diagram 308 of FIG. 3). In various embodiments, hardware processors 1012 can utilize a 3D point cloud rendering to display the 3D virtual reconstruction of the surgical subject. Accordingly, the 3D virtual reconstruction of the surgical subject may comprise a three-dimensional rendering that keeps real-world proportions. The 3D virtual reconstruction of the surgical subject may be a real-world live representation of the surgical subject made to appear on top of a physical surface (e.g., a surgical table) located in the second geographic location. By looking at the 3D virtual reconstruction of the surgical subject, the first person (e.g., the expert surgeon) can see in real-time what is happening to the surgical subject. As alluded to above (and as will be described in conjunction with instruction 1020), the first person (e.g., the expert surgeon) can also interact with the 3D virtual reconstruction of the surgical subject by placing hands on particular anatomical regions of the 3D virtual reconstruction of the surgical subject, and by annotating on (or proximate to) anatomical regions of interest on the 3D virtual reconstruction of the surgical subject. As will be described below, both hand gestures and 3D annotations performed by the first person may show up in real-time in an augmented reality (AR) view of a second person (e.g., the novice surgeon) located at the first geographic location.

Accordingly, hardware processors 1012 may execute instruction 1020 to determine a spatial relationship (e.g., a 3D orientation and 3D position-based relationship) between a hand gesture performed by the first person and the 3D virtual reconstruction of the surgical subject as the 3D virtual reconstruction of the surgical subject is made to appear on the head-mounted VR display. As alluded to above (and as will be described in conjunction with instruction 1022), the determined spatial relationship between the hand gesture and the 3D virtual reconstruction of the surgical subject (as it is made to appear on head-mounted VR display) may be replicated/emulated when a 3D avatar of the hand gesture is displayed on a head-mounted AR display worn by the second person (e.g., the novice surgeon) located at the first geographic location. Accordingly, the 3D avatar of the hand gesture can be made to appear in a spatial relationship with respect to the surgical subject that mirrors the determined spatial relationship between the hand gesture and the 3D virtual reconstruction of the surgical subject as it is made to appear on the head-mounted VR display (in other words, the spatial relationship between the physical hand gesture and the 3D virtual reconstruction of the surgical subject may be preserved when a 3D avatar of the hand gesture is made to appear proximate to the actual surgical subject). In this way, embodiments can uniquely and precisely allow the first person (e.g., the expert surgeon) to anchor hand gestures in spatial relationship to the 3D virtual reconstruction of the surgical subject in a manner that emulates if the first person were physically located at the first geographic location making hand gestures over the (actual i.e., non-virtual) surgical subject (e.g., pointing to an anatomical region of interest on the surgical subject, demonstrating a surgical maneuver/technique over an anatomical region of interest on the surgical subject, annotating on an anatomical region of interest on the surgical subject, etc.).

In some examples, executing instruction 1020 may first involve obtaining 3D position information and 3D orientation information related to the hand gesture and a physical surface onto which the 3D virtual reconstruction of the surgical subject is made to appear on the head-mounted VR display. Obtaining this 3D orientation and 3D position information may comprise using at least one of a motion capture system associated with the second geographic location and a depth camera located at the second geographic location. The motion capture system associated with the second geographic location may comprise a motion capture camera located at the second geographic location and tracker markers located on the gesturing hand of the first person (e.g., attached to a glove worn by the first) and the physical surface (e.g., a table or surgical table) onto which 3D virtual reconstruction of the surgical subject is made to appear. In other examples, hardware processors 1012 can obtain the 3D position and 3D orientation information using different types of motion tracking systems/technologies (e.g., computer-vision based motion tracking, inertial sensors, electromagnetic systems, etc.).

The captured hand gesture may be various types of hand gestures related to surgical instruction. For example, the hand gesture may involve the first person demonstrating a surgical technique/maneuver over (or proximate to) an anatomical region of the 3D virtual reconstruction of the surgical subject, the first person pointing to the anatomical region of the 3D virtual reconstruction of the surgical subject, the first person making a 3D annotation on (or proximate to) the anatomical region of the 3D virtual reconstruction of the surgical subject, etc.

In various embodiments, hardware processors 1012 can determine a spatial relationship (e.g., a 3D orientation and 3D position-based relationship) between an object/implement held by the first person and the 3D virtual reconstruction of the surgical subject as the 3D virtual reconstruction of the surgical subject is made to appear on the head-mounted VR display. This may comprise first obtaining 3D position and 3D orientation information related the object/implement held by the first person. For example, hardware processors 1012 may obtain 3D position and 3D orientation information associated with a surgical implement (e.g., a real or mock scalpel) held in the first person's hand while demonstrating a surgical technique/maneuver. Relatedly, hardware processors 1012 may obtain 3D position and 3D orientation information associated with a writing implement (e.g., a pen controller used for making 3D virtual annotations) held in the first person's hand while making an annotation on (or proximate to) an anatomical region of the 3D virtual reconstruction of the surgical subject. In certain embodiments, hardware processors 1012 may obtain this information using a motion tracking camera located at the second geographic location and tracker markers attached to the object/implement held by the first person.

Hardware processors 1012 may execute instruction 1022 to display, on a head-mounted augmented reality (AR) display worn by a second person located in the first geographic location, a 3D avatar (i.e., a 3D representation which may appear as a 3D projection/holograph) of the hand gesture made to appear in a spatial relationship to the surgical subject that mirrors the determined spatial relationship (e.g., a 3D position and 3D orientation-based relationship) between the hand gesture and the 3D virtual reconstruction of the surgical subject as the 3D virtual reconstruction of the surgical subject is made to appear on the head-mounted VR display. In this way, embodiments can uniquely and precisely allow the first person (e.g., the expert surgeon) to anchor virtual hand gestures in relation to the surgical subject in a manner that emulates if the first person were physically located at the first geographic location making hand gestures over the (actual i.e., non-virtual) surgical subject.

As alluded to above, hardware processors 1012 may display, on the head-mounted AR display worn by the second person, a live 3D avatar of the first person's hands (including the hand gesture). The 3D avatar of the hands/hand gesture may include a 3D avatar of an implement held by the first person (e.g., a 3D avatar of a surgical implement held by the first person, a 3D avatar of a writing implement held by the first person, etc.). In embodiments where the hand gesture of the first person comprises an annotation made by the first person proximate to an anatomical region of the 3D virtual reconstruction of the surgical subject, the 3D avatar of the hand gesture may comprise a 3D virtual written annotation made to appear proximate to the corresponding anatomical region of the surgical subject. Here, the 3D virtual written annotation may be displayed to appear as if written by a 3D avatar of an implement held by the first person.

As alluded to above (and as depicted in the example of FIG. 9), in various embodiments displaying the 3D avatar of the hand gesture to appear in the spatial relationship to the surgical subject that mirrors the determined spatial relationship between the hand gesture and the 3D virtual reconstruction of the surgical subject (as the 3D virtual reconstruction of the surgical subject is made to appear on the head-mounted VR) may require calibrating a coordinate system of the head-mounted AR display. As described above, such a calibration may comprise: (1) performing a first calibration to calibrate the coordinate system of the head-mounted AR display (worn by the second person at the first geographic location) with a coordinate system of the depth camera (located at the first geographic location); and (2) performing a second calibration to calibrate the first calibrated coordinate systems (i.e., the coordinate systems of the head-mounted AR display and the depth camera) with a coordinate system of the head-mounted VR display (worn by the first person at the second geographic location).

As depicted in FIG. 9, calibrating the coordinate system of the head-mounted AR display with the coordinate system of the depth camera may comprise: (1) using a motion tracking system associated with the first geographic location (e.g., a motion capture camera located at the first geographic location and tracker markers associated with the head-mounted AR display and the depth camera) to determine a spatial relationship between the head-mounted AR display and the depth camera; (2) synchronizing the head-mounted AR display and the depth camera using a calibration marker in view of the head-mounted AR display and the depth camera; and (3) calibrating the coordinate system of the head-mounted AR display with the coordinate system of the depth camera based on the determined spatial relationship between the head-mounted AR display and the depth camera and the synchronization between the head-mounted AR display and the depth camera.

Calibrating the first calibrated coordinate systems with the coordinate system of the head-mounted VR display may comprise: (1) using the motion capture camera located in the second geographic location to determine a spatial relationship between the head-mounted VR display and the surface onto which the 3D virtual reconstruction of the surgical subject is made to appear on the head-mounted VR display (as alluded to above, tracker markers may be associated with both the head-mounted VR display and the surface onto which the 3D virtual reconstruction of the surgical subject is made to appear—these tracker markers may be used in conjunction with the motion capture camera located in the second geographic location to determine the spatial relationship between the two objects); and (2) calibrating the first calibrated coordinate systems with the coordinate system of the head-mounted VR display based on this determined spatial relationship.

Figure 11:
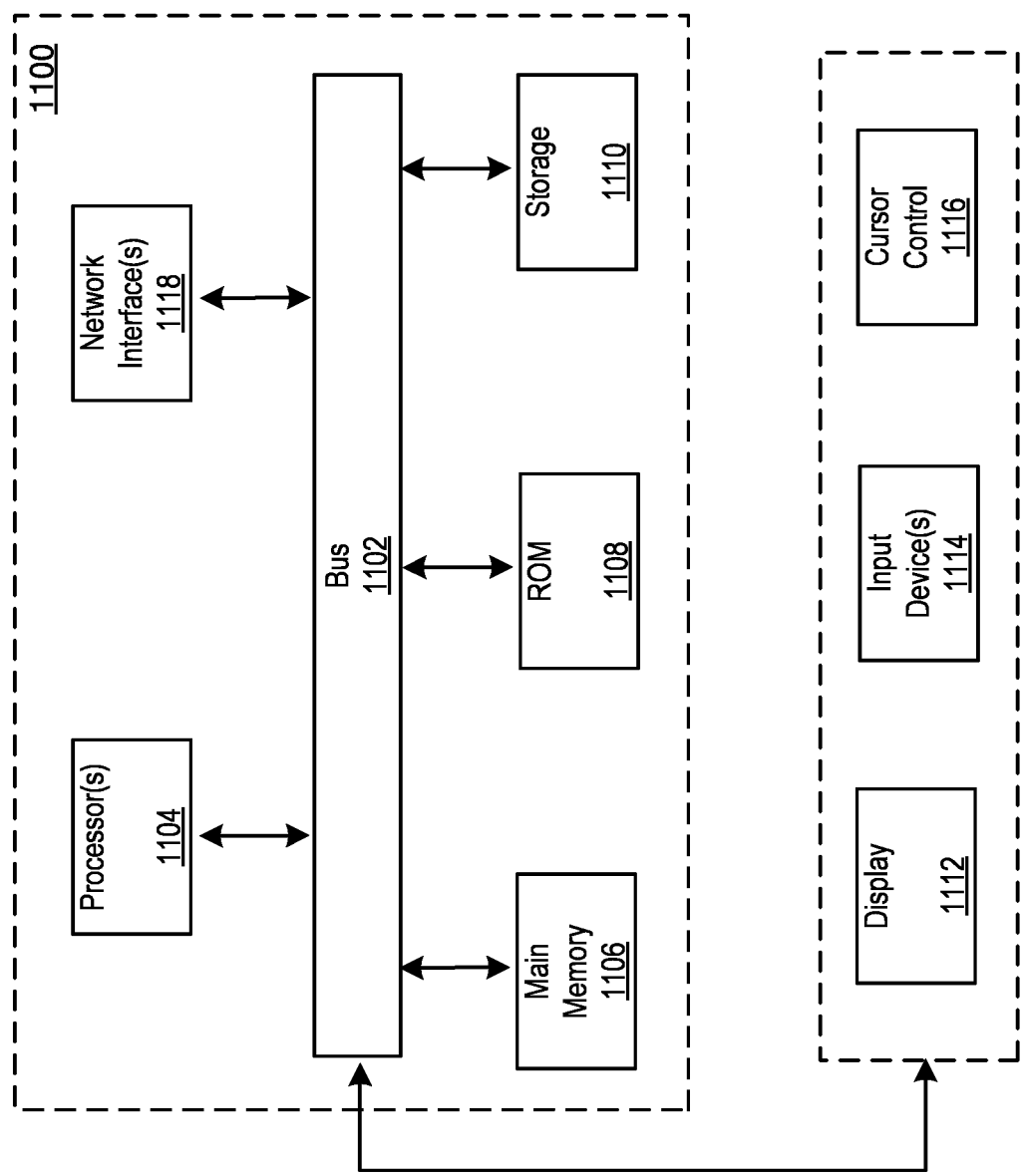
FIG. 11 depicts a block diagram of an example computer system in which various of the embodiments described herein may be implemented.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   obtaining, from a depth camera located in a first geographic location, 3D images of a surgical subject located in the first geographic location;
   displaying, on a virtual reality (VR) display worn by a first person located in a second geographic location, a 3D virtual reconstruction of the surgical subject based on the obtained 3D images of the surgical subject;
   determining a spatial relationship between a hand gesture performed by the first person and the 3D virtual reconstruction of the surgical subject as the 3D virtual reconstruction of the surgical subject is made to appear on the VR display;
   displaying, on an augmented reality (AR) display worn by a second person located in the first geographic location, a 3D avatar of the hand gesture made to appear in a spatial relationship to the surgical subject that mirrors the determined spatial relationship between the hand gesture and the 3D virtual reconstruction of the surgical subject as the 3D virtual reconstruction of the surgical subject is made to appear on the VR display; and
   responsive to manual inputs provided by the first person, modifying display parameters of the AR display worn by the second person, wherein modifying the display parameters of the AR display worn by the second person comprises at least one of:
      changing visibility of the 3D avatar of the hand gesture, or causing a supplemental instructional video to be displayed and played on the AR display in addition to the 3D avatar of the hand gesture.

2. The method of claim 1, wherein the first person is providing surgical instruction to the second person.

3. The method of claim 1, wherein determining the spatial relationship between the hand gesture and the 3D virtual reconstruction of the surgical subject as the 3D virtual reconstruction of the surgical subject is made to appear on the VR display comprises:
   obtaining 3D position information and 3D orientation information related to the hand gesture and a physical surface onto which the 3D virtual reconstruction of the surgical subject is made to appear on the VR display.

4. The method of claim 3, wherein obtaining the 3D position information and 3D orientation information related to the hand gesture and the physical surface onto which the 3D virtual reconstruction of the surgical subject is made to appear on the VR display comprises using at least one of a motion capture system associated with the second geographic location and a depth camera located at the second geographic location.

5. The method of claim 4, wherein the motion capture system associated with the second geographic location comprises a motion capture camera located at the second geographic location and tracker markers located on the gesturing hand of the first person and the physical surface onto which 3D virtual reconstruction of the surgical subject is made to appear.

6. The method of claim 5, wherein:
   the hand gesture comprises an annotation performed proximate to an anatomical region of the 3D virtual reconstruction of the surgical subject.

7. The method of claim 6, wherein:
   the annotation is performed using a pen controller for making virtual written annotations; and
   the 3D position information and 3D orientation information related to the annotation is obtained using the motion capture camera located at the second geographic location and a tracker marker attached to the pen controller.

8. The method of claim 6, wherein displaying the 3D avatar of the annotation to appear in the spatial relationship to the surgical subject that mirrors the determined spatial relationship between the annotation and the 3D virtual reconstruction of the surgical subject as the 3D virtual reconstruction of the surgical subject is made to appear on the VR display comprises:
   displaying, on the AR display worn by the second person located in the first geographic location, a 3D virtual written annotation made to appear proximate to an anatomical region of the surgical subject corresponding to the anatomical region of the 3D virtual reconstruction of the surgical subject.

9. A collaborative mixed reality system comprising:
   a depth camera that obtains 3D images of a surgical subject located in a first geographic location;
   a VR display worn by a first person located in a second geographic location that displays a 3D virtual reconstruction of the surgical subject based on the obtained 3D images of the surgical subject;
   a motion capture camera located in the second geographic location that obtains 3D position information and 3D orientation information for a hand of the first person and a surface onto which the 3D virtual reconstruction of the surgical subject is made to appear on the VR display;
   one or more processing resources and non-transitory computer-readable medium, coupled to the one or more processing resources, having stored therein instructions that when executed by the one or more processing resources cause the collaborative mixed reality system to:
      use the 3D position information and 3D orientation information obtained by the motion capture camera located in the second geographic location to determine a spatial relationship between the hand of the first person and the 3D virtual reconstruction of the surgical subject as the 3D virtual reconstruction of the surgical subject is made to appear on the VR display; and
    an AR display worn by a second person located in the first geographic location that:
        displays a 3D avatar of the hand made to appear in a spatial relationship to the surgical subject that mirrors the determined spatial relationship between the hand and the 3D virtual reconstruction of the surgical subject as the 3D virtual reconstruction of the surgical subject is made to appear on the VR display; and
        a control panel located at the second geographic location configured to permit the first person to modify display parameters of the AR display by at least one of: changing visibility of the 3D avatar of the hand, or causing a supplemental instructional video to be displayed and played on the AR display in addition to the 3D avatar of the hand.

10. The collaborative mixed reality system of claim 9, further comprising:
    a motion tracking system associated with the first geographic location, the motion tracking system associated with the first geographic location comprising a motion capture camera located at the first geographic location and tracker markers associated with the AR display and the depth camera respectively.

11. The collaborative mixed reality system of claim 10, wherein the instructions executed by the one or more processing resources further cause the collaborative mixed reality system to:
    calibrate a coordinate system of the AR display in order to display the 3D avatar of the hand to appear in the spatial relationship to the surgical subject that mirrors the determined spatial relationship between the hand and the 3D virtual reconstruction of the surgical subject as the 3D virtual reconstruction of the surgical subject is made to appear on the VR display.

12. The collaborative mixed reality system of claim 11, wherein calibrating the coordinate system of the AR display in order to display the 3D avatar of the hand to appear in the spatial relationship to the surgical subject that mirrors the determined spatial relationship between the hand and the 3D virtual reconstruction of the surgical subject as the 3D virtual reconstruction of the surgical subject is made to appear on the VR display comprises:
    performing a first calibration to calibrate the coordinate system of the AR display with a coordinate system of the depth camera; and
    performing a second calibration to calibrate the first calibrated coordinate systems with a coordinate system of the VR display.

13. The collaborative mixed reality system of claim 12, wherein calibrating the coordinate system of the AR display with the coordinate system of the depth camera comprises:
    using the motion tracking system associated with the first geographic location to determine a spatial relationship between the AR display and the depth camera;
    synchronizing the AR display and the depth camera using a calibration marker in view of the AR display and the depth camera; and
    calibrating the coordinate system of the AR display with the coordinate system of the depth camera based on the determined spatial relationship between the AR display and the depth camera and the synchronization between the AR display and the depth camera.

14. The collaborative mixed reality system of claim 12, wherein calibrating the first calibrated coordinate systems with the coordinate system of the VR display comprises:
    using the motion capture camera located in the second geographic location to determine a spatial relationship between the VR display and the surface onto which the 3D virtual reconstruction of the surgical subject is made to appear on the VR display.

15. The collaborative mixed reality system of claim 9, wherein the collaborative mixed reality system further comprises:
    a pen controller for making virtual written annotations and a tracker marker located on the pen controller.

16. The collaborative mixed reality system of claim 15, wherein the motion capture camera located in the second geographic location further obtains 3D position information and 3D orientation information for the pen controller using the tracker marker located on the pen controller.

17. The collaborative mixed reality system of claim 16, wherein:
    the instructions executed by the one or more processing resources further cause the collaborative mixed reality system to determine, based on the 3D position information and 3D orientation information obtained by the motion capture camera located in the second geographic location, a spatial relationship between the pen controller and the 3D virtual reconstruction of the surgical subject as the 3D virtual reconstruction of the surgical subject is made to appear on the VR display; and
    the AR display worn by the second person located in the first geographic location further displays a 3D avatar of the pen controller made to appear in a spatial relationship to the surgical subject that mirrors the determined spatial relationship between the pen controller and 3D virtual reconstruction of the surgical subject as the 3D virtual reconstruction of the surgical subject is made to appear on the VR display.

18. The collaborative mixed reality system of claim 17, wherein the AR display further displays the 3D avatar of the pen controller making a 3D virtual written annotation.

19. A system comprising:
    one or more processing resources; and
    non-transitory computer-readable medium, coupled to the one or more processing resources, having stored therein instructions that when executed by the one or more processing resources cause the system to:
        obtain 3D images of a surgical subject located in a first geographic location, display, on a VR display worn by a first person located in a second geographic location, a 3D virtual reconstruction of the surgical subject based on the obtained 3D images of the surgical subject, determine a spatial relationship between a hand of the first person and the 3D virtual reconstruction of the surgical subject as the 3D virtual reconstruction of the surgical subject is made to appear on the VR display, display, on an AR display worn by a second person located in the first geographic location, a 3D avatar of the hand of the first person made to appear in a spatial relationship to the surgical subject that mirrors the determined spatial relationship between the hand of the first person and the 3D virtual reconstruction of the surgical subject as the 3D virtual reconstruction of the surgical subject is made to appear on the VR display, and responsive to manual inputs provided by the first person, modify display parameters of the AR display worn by the second person, wherein modifying the display parameters of the AR display worn by the second person comprises at least one of:
changing visibility of the 3D avatar of the hand, or causing a supplemental instructional video to be displayed and played on the AR display in addition to the 3D avatar of the hand.

20. The system of claim 19, wherein the first person is providing surgical instruction to the second person.

* * * * *